United States Patent [19]
Cornell et al.

[11] 3,914,938
[45] Oct. 28, 1975

[54] ELECTRICAL HYDROSTATIC TRANSMISSION CONTROL SYSTEM

[75] Inventors: Charles R. Cornell, Battle Creek, Mich.; Gerald F. O'Callaghan, Kenosha, Wis.

[73] Assignee: Eaton Corporation, Cleveland, Ohio

[22] Filed: Aug. 20, 1974

[21] Appl. No.: 499,002

[52] U.S. Cl. .................... 60/395; 60/420; 60/445; 60/490; 60/DIG. 2; 180/6.48
[51] Int. Cl.² .................... F15B 18/00; F16H 39/46; B62D 11/04
[58] Field of Search ............ 60/388, 390, 395, 420, 60/443, 444, 445, 448, 465, 484, 486, 487, 490, DIG. 2; 180/6.48; 404/84

[56] References Cited
UNITED STATES PATENTS

| | | | |
|---|---|---|---|
| 2,939,285 | 6/1960 | Hawkins et al. | 60/395 |
| 3,572,959 | 3/1971 | Shaughnessy | 60/395 X |
| 3,848,690 | 11/1974 | Hawkins | 180/6.48 |

*Primary Examiner*—Edgar W. Geoghegan
*Attorney, Agent, or Firm*—Teagno & Toddy

[57] ABSTRACT

An improved apparatus is provided to control the operation of a plurality of hydrostatic transmissions which are advantageously utilized to drive the tracks of a vehicle. This apparatus includes a signal generator which provides an electrical ratio command signal which is variable to correspond to any one of a plurality of displacements and output speeds of a pair of hydrostatic transmissions. Right and left steering command signal generators are selectively operable to provide electrical steering command signals which effect operation of actuator assemblies to vary the output speed of one of the hydrostatic transmissions relative to the other hydrostatic transmission to turn the vehicle. A straight tracking control apparatus includes a pair of speed sensing units which are effective to provide electrical speed signals which vary in value as a function of variations in the output speed of an associated hydrostatic transmission. During movement of the vehicle along a straight path, the electrical speed signals are compared and utilized to effect activation of one or more of the actuator assemblies if the output speed of one of the transmissions is different from the output speed of the other transmission. Upon actuation of the steering controls, the straight tracking apparatus is rendered ineffective so that the vehicle can be turned. Anti-stall circuitry is provided to prevent overloading of the engine.

24 Claims, 8 Drawing Figures

ELECTRICAL HYDROSTATIC TRANSMISSION CONTROL SYSTEM

BACKGROUND OF THE INVENTION

The present invention relates generally to a hydrostatic transmission control system and more specifically to an electrical control system which may be advantageously utilized to control the operation of a plurality of hydrostatic transmissions.

Hydraulic controls have been utilized to vary the input to output speed ratios of hydrostatic transmissions utilized to drive the tracks of vehicles. Known hydraulic transmission controls have included a main or speed control member which is actuable to cause hydraulic control circuitry to vary the displacements and output speed of a pair of hydrostatic transmissions by substantially equal amounts to thereby vary the forward speed of movement of the vehicle. In addition, selectively actuatable steering controls have been provided to vary the displacement of one of the hydrostatic transmissions relative to the other hydrostatic transmission to effect a turning of the vehicle. One known hydraulic control system is disclosed in U.S. Pat. No. 3,795,109.

During movement of a vehicle along a straight path, hydraulic controls have been utilized to equalize the output speeds of two hydrostatic transmissions. To prevent the application of excessive loads on an engine for driving a hydrostatic transmission, hydraulic anti-stall systems have been utilized in association with an engine which drives the transmissions.

The hydraulic controls utilized to provide the speed, steering, straight tracking, and anti-stall control functions have increased in complexity and cost as the controls have become more sophisticated and accurate. Of course, the increased complexity of the hydraulic controls substantially increases the cost of making these controls. In what may have been an effort to overcome these difficulties, the use of electrical controls in association with a hydrostatic transmission has been disclosed in U.S. Pat. Nos. 3,438,201; 3,543,654; and 3,628,330. In addition, electrical controls for controlling the operation of a hydrostatic transmission is disclosed in U.S. Pat. application Ser. No. 446,658, filed Feb. 28, 1974, by Kenneth K. Knapp and Charles R. Cornell, and entitled "Hydrostatic Transmission Control System."

SUMMARY OF THE PRESENT INVENTION

The present invention provides an improved electrical control system for controlling the operation of a pair of hydrostatic transmissions. The electrical control system includes a main or ratio command signal generator which provides an electrical command signal for effecting operation of hydraulic actuators to vary the displacement of pump and/or motor units of a pair of hydrostatic transmissions to thereby vary the output speeds of the transmissions. When the transmissions are utilized to drive the tracks of a crawler-type vehicle, left and right steering signal generators are utilized to provide electrical steering signals which activate electrical control circuitry to effect variations in the speed at which one of the tracks is driven relative to the speed at which the other track is driven.

During straight forward movement of the vehicle, a straight tracking control system is advantageously utilized to equalize the output speeds of the two hydrostatic transmissions. This straight tracking control system includes a pair of speed signal generators each of which is effective to provide an electrical speed signal indicative of the output speed of an associated one of the hydrostatic transmissions. A comparator compares the value of the two electrical speed signals and effects a change in the displacement of at least one of the hydrostatic transmissions if the electrical speed signals indicate that one of the transmissions has a higher output speed than the other transmission.

An anti-stall control system may be utilized to prevent overloading of an engine which drives the hydrostatic transmissions. This anti-stall control system includes an engine speed signal generator and a throttle setting signal generator. Electrical engine speed and throttle setting signals are compared and if the engine speed is below the speed indicated by the throttle setting signal, the electrical ratio command signal is modified to effect a reduction in the output speeds of the hydrostatic transmissions and the load on the engine.

BRIEF DESCRIPTION OF THE DRAWINGS

The foregoing and other objects and features of the present invention will become more apparent upon a consideration of the following description taken in connection with the accompanying drawings wherein:

FIG. 4 is a schematic illustration of steering control circuitry;

FIG. 5 is a schematic illustration of electrical control circuitry for effecting operation of hydraulic actuators to vary the displacement and output speed of one hydrostatic transmission;

FIG. 6 is a schematic illustration of electrical control circuitry for effecting operation of hydraulic actuators to vary the displacement and output speed of the other hydrostatic transmission;

FIG. 7 is a schematic illustration of a straight tracking control circuitry; and FIG. 8 is a schematic illustration of anti-stall control circuitry.

DESCRIPTION OF SPECIFIC PREFERRED EMBODIMENTS OF THE INVENTION

General Description

Figure 1:
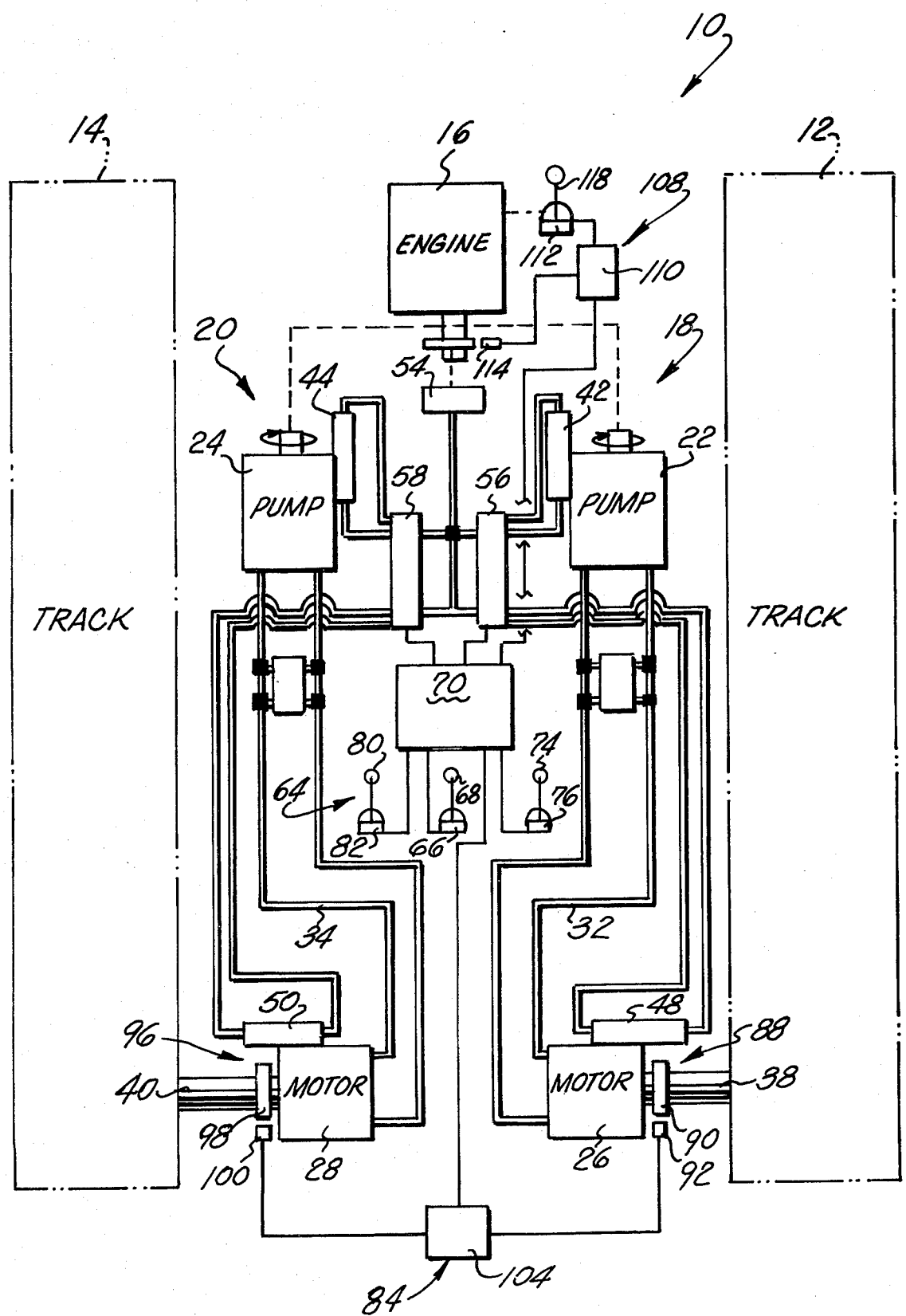
FIG. 1 is a schematic illustration of electrical control circuitry constructed in accordance with the present invention in association with a pair of hydrostatic transmissions which are utilized to drive tracks of a crawler-type vehicle.

Although it is contemplated that electrical circuitry constructed in accordance with the present invention will be utilized in many different environments, it is illustrated in FIG. 1 in association with a crawler-type vehicle 10 having a pair of tracks 12 and 14. The tracks 12 and 14 are driven by an engine 16 through a pair of hydrostatic transmissions 18 and 20. The hydrostatic transmissions 18 and 20 include variable displacement pump units 22 and 24 and variable displacement motor units 26 and 28. The pump units are driven by the engine 16 through a gear box (not shown) and are effective to pump fluid through hydrostatic loops 32 and 34 to effect operation of the motor units 26 and 28 in a known manner. The motor units 26 and 28 are connected to the tracks 12 and 14 by motor drive shafts 38 and 40 and final drive gear boxes.

A pair of hydraulic actuator assemblies 42 and 44 are operable to either forward or reverse actuated conditions to vary the displacement of the pump units 22 and 24. The pump units 22 and 24 are advantageously of the axial piston type and have swashplates which are movable in either one of two directions from a minimum displacement or neutral position to effect either forward or reverse movement of the vehicle 10. The actuator assemblies 42 and 44 include reversible hydraulic motors having movable pistons connected with the swashplates of the pump units 22 and 24.

When the pump units 22 and 24 are in a forward operating condition, the pump units are effective to direct fluid to the motor units 26 and 28 through the hydrostatic loops 32 and 34 in one direction. When the actuator assemblies 42 and 44 have been operated to move the swashplates of the pump units 22 and 24 to a reverse operating condition, the pump units are effective to direct fluid through hydrostatic loops 32 and 34 in the opposite direction. Of course, this effects operation of the motor units 26 and 28 to drive the tracks of the vehicle 10 in a reverse direction.

During movement of the vehicle 10 in a forward direction at a relatively slow speed, the displacement of only the pump units 22 and 24 is varied to effect variations in the speed at which the motor units 26 and 28 drive the tracks 12 and 14 of the vehicle.

If higher operating speeds are desired after the pump units 22 and 24 have been actuated to their maximum displacement conditions, actuator assemblies 48 and 50 are operated to move the swashplates of the motor units 26 and 28 from a maximum displacement condition toward a minimum displacement condition to thereby increase the output speed of the motor units in a known manner. The motor actuator assemblies 48 and 50 include reversible hydraulic motors having movable pistons connected with the swashplates of the motor units 26 and 28. The actuator assemblies 42, 44, 48 and 50 are supplied with fluid from a charge pump 54 through valve assemblies 56 and 58. Although it is contemplated that the actuator assemblies 42, 44, 48 and 50 could have many different constructions, they may be constructed in the manner disclosed in U.S. Pat. No. 3,795,109.

In accordance with a feature of the present invention, an electrical control system 64 is utilized to control the operation of the actuator assemblies 42, 44, 48 and 50 to vary the displacements and output speeds of the hydrostatic transmissions 18 and 20. The electrical control system 64 includes a main or ratio command signal generator 66. The ratio command signal generator 66 provides an electrical command signal which is varied to effect variations in the input to output speed ratio of the hydrostatic transmissions 18 and 20. The ratio command signal varies in value as a function of variations in the position of a manually actuatable control lever 68. Electrical control circuitry 70 is activated, in response to variations in the ratio command signal, to effect operation of the valve assemblies 56 and 58. Upon operation of the valve assemblies 56 and 58, the pump and/or motor actuator assemblies 42, 44, 48 and 50 are operated to vary the displacement of the pump and/or motor units 22, 24, 26 and 28.

If it is desired to turn the vehicle toward the right, a steering control lever 74 is actuated to cause a secondary or steering control signal generator 76 to provide an electrical steering signal. The electrical control apparatus 70 effects operation of the valve assembly 56, in response to the steering signal, to decrease the output speed of the hydrostatic transmission 18 and the speed at which the track 12 is driven. Of course, this causes the vehicle 10 to turn toward the right. Similarly, upon operation of a left steering conrol level 80, a secondary or steering signal generator 82 provides an electrical steering signal to effect operation of the valve assembly 58 and a reduction in the output speed of the hydrostatic transmission 20.

During straight forward movement of the vehicle 10, the hydrostatic transmissions 18 and 20 are effective to drive the tracks 12 and 14 at the same speed. However, if the load on one of the tracks is varied relative to the load on the other track, the output speed of one of the transmissions tends to decrease relative to the output speed of the other transmission. To prevent this from happening, a straight tracking control apparatus 84 is provided to effect operation of the control circuitry 70 to prevent variations in the output speed of one of the hydrostatic transmissions relative to the other hydrostatic transmission.

The straight tracking control apparatus 84 includes a speed sensing unit 88 which senses the output speed of the hydrostatic transmission 18. The speed sensing unit 88 includes a ferrous toothed wheel 90 which is fixedly connected with the motor output shaft 38. A pickup head 92 cooperates with the toothed wheel 90 to provide pulses at a rate which varies as a function of variations in the speed of rotation of the toothed wheel 90. The pickup head 92 is of a known construction and includes a coil disposed in a magnetic field which is effected by movement of the teeth on the wheel 90.

Similarly, a second speed sensing unit 96 is provided in association with the hydrostatic transmission 20. The speed sensing unit 96 includes a toothed wheel 98 which is fixedly connected with the motor output shaft 40. Upon rotation of the ferrous toothed wheel 98, pulses are provided from a pickup head 100 at a rate which varies as a function of variations in the speed of rotation of the wheel 98.

The straight tracking control apparatus 84 includes control circuitry 104 for comparing the output signals from the speed sensing units 88 and 96. Upon a variation in the output speed of one of the hydrostatic transmissions relative to the other hydrostatic transmission, the circuitry 104 provides an electrical straight tracking control signal to effect a reduction in the speed of the faster hydrostatic transmission and an increase in the speed of the slower hydrostatic transmission. However if desired, the speed of only one of the hydrostatic transmissions could be varied in response to a straight tracking control signal.

To prevent overloading of the engine 16, anti-stall apparatus 108 is effective to compare the engine output speed with a throttle setting signal. If the engine output speed falls below the speed corresponding to the throttle setting signal, the anti-stall control circuitry 108 is effective to transmit a signal to the control circuitry 70 to effect a reduction in the output speeds of the two hydrostatic transmissions 18 and 20.

The anti-stall apparatus 108 includes control circuitry 110 which receives an electrical signal from a throttle setting signal generator 112. In addition, the anti-stall control circuitry 110 receives a signal from an engine output speed sensing unit 114. As long as the engine output speed signal indicates that the engine 16 is operating at a speed which is higher than a speed corresponding to the setting of the throttle lever 118, the anti-stall unit 108 is ineffective to provide a signal to the control circuitry 70. However, if the engine speed should fall below a speed corresponding to the throttle setting, the anti-stall control circuitry 110 provids a signal which effects activation of the control circuitry 70 to reduce the output speeds of the two hydrostatic transmissions 18 and 20 by substantially equal amounts.

GENERAL DESCRIPTION OF THE EMBODIMENT OF FIG. 2

Figure 2:
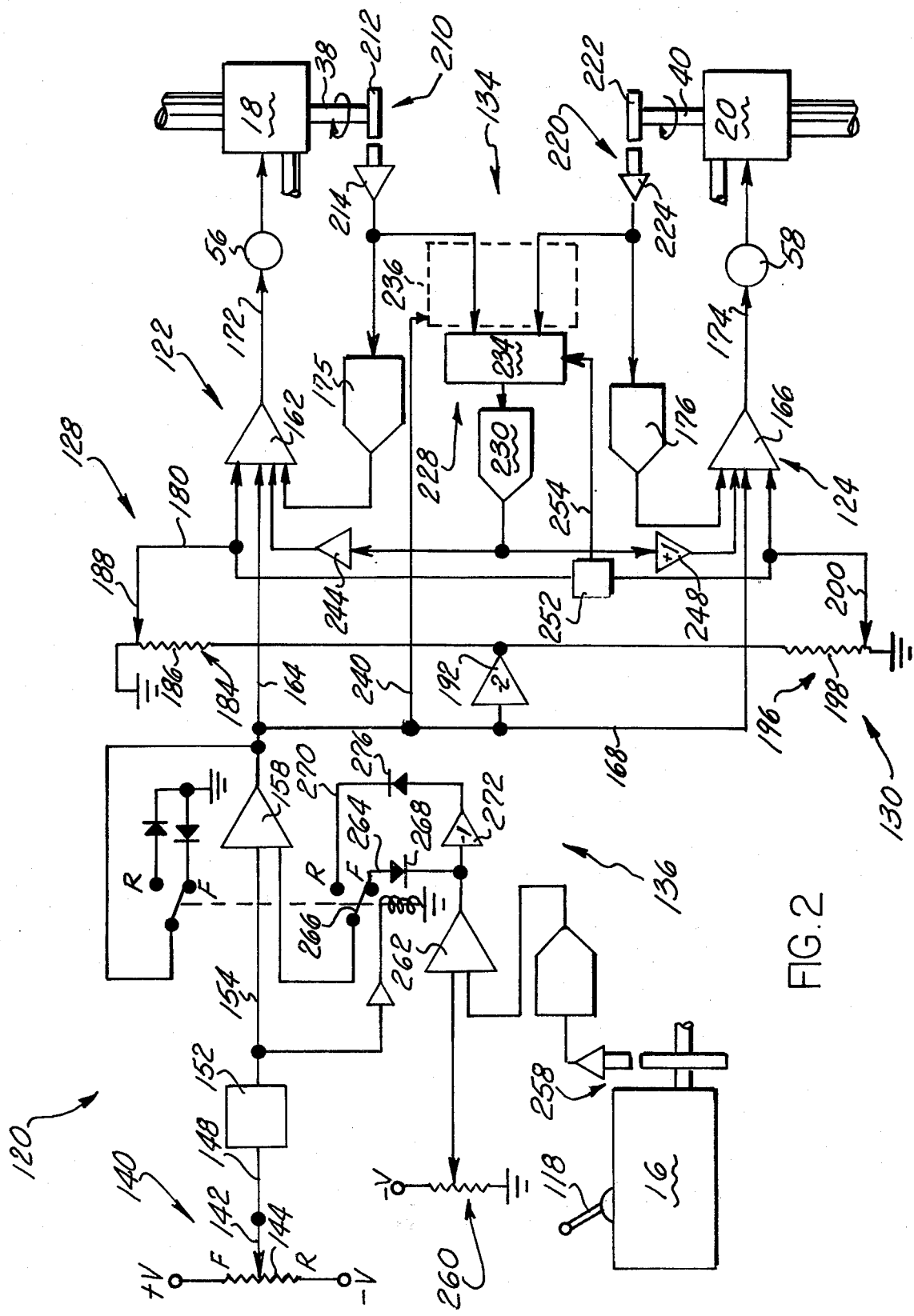
FIG. 2 is a schematic illustration of one embodiment of the electrical control circuitry.

One specific preferred embodiment of the control apparatus of FIG. 1 is illustrated in FIG. 2. This apparatus includes main or ratio command control circuitry 120 which is effective to provide an electrical ratio command signal. This signal is transmitted to right and left transmission control circuits 122 and 124 to effect operation of the control valve assemblies 56 and 58 to vary the output speeds of the hydrostatic transmission 18 and 20 by substantially equal amounts in response to a variation in the ratio command signal.

Right and left steering control units 128 and 130 are associated with the transmission control circuitry 122 and 124 to vary the output speed of one of the transmissions relative to the other transmission to effect a turning of the vehicle. During straight forward movement of the vehicle, straight tracking controls 134 are effective to equalize the output speeds of the two hydrostatic transmissions 18 and 20. Finally, an anti-stall control assembly 136 is provided to prevent overloading of the engine 16.

Ratio Command Control Circuitry

The ratio command control circuitry 120 (FIG. 2) includes a ratio command signal generator 140 which is selectively operable to vary a main or ratio command signal. The value of the ratio command signal varies as a function of variations in the input to output speed ratios of the hydrostatic transmissions 18 and 20. The ratio command signal generator 140 is a potentiometer having a wiper 142 which is moved relative to a resistance 144 upon actuation of a control lever, similar to the control lever 68 of FIG. 1. Of course, movement of the potentiometer wiper 142 relative to the resistance 144 varies the voltage of a ratio command signal transmitted from the signal generator 140 over a lead 148.

When the wiper 142 is in the neutral position illustrated in FIG. 2, a zero voltage ratio command signal is provided and the hydrostatic transmissions 18 and 20 are ineffective to drive the tracks 12 and 14. When the hydrostatic transmissions 18 and 20 are to drive the tracks 12 and 14 forwardly, the pointer 142 is moved upwardly (as viewed in FIG. 2) to provide a positive polarity voltage signal on the lead 148. The greater the upward movement of the wiper 142, the greater the voltage of the command signal and the faster the tracks 12 and 14 are driven.

When the hydrostatic transmissions 18 and 20 are to drive the tracks 12 and 14 rearwardly, the pointer 142 is moved downwardly (as viewed in FIG. 2) from the neutral position to provide a negative polarity voltage signal on the lead 148. The greater the downward movement of the wiper 142, the greater the absolute value of the negative command signal voltage and the faster the tracks 12 and 14 are driven in reverse.

To prvent excessive rates of acceleration or deceleration, rate limiter circuitry 152 limits the rate of change of the ratio command signal. Thus upon rapid movement of the pointer 142, the rate limiter circuitry 152 operates on the ratio command signal so that the rate of change of the ratio command signal transferred over a lead 154 is limited to a predetermined maximum rate. Although the rate limiter circuitry 152 dampens changes in the ratio command signal, it should be understood that the rate limiter circuitry 152 does not prevent the ratio command signal transmitted over the lead 154 from eventually obtaining a value corresponding to the position of the pointer 142.

The ratio command signal is transmitted over the lead 154 from the rate limiter 152 to an adder or summing amplifier 158. The adder or summer amplifier 158 is also connected with the anti-stall control circuitry 136 and is effective to modify the ratio command signal in the event that there is an impending stall condition.

In the absence of an impending stall, the ratio command signal is transmitted to an adder or summing amplifier 162 in the right transmission control circuitry 122 over a lead 164 and is transmitted to a second adder or summing amplifier 166 in the left transmission control circuitry 124 over a lead 68. The adders 162 and 166 also receive inputs from the steering control units 128 and 130 and from the straight tracking units 134.

The electrical control signals are transmitted to the valve assemblies 56 and 58 from the adders 162 and 166 over lead 172 and 174. These signals effect operation of torque motor actuated control valves which hydraulically operate servos to port fluid under pressure to effect operation of the pump and/or motor actuator assemblies 42, 44, 48 and 50.

The straight tracking control circuitry 143 provides speed signals to feedback circuits 175 and 176. When the output speeds of the hydrostatic transmissions 18 and 20 correspond to the ratio command signal, the feedback circuits 175 and 176 transmit signals to the adders 162 and 166 of opposite polarity to the ratio command signal. The valve assemblies 56 and 58 then modulate to maintain the displacement and output speeds of the transmissions 18 and 20 constant.

Steering Control Circuitry

When the vehicle 10 is to be turned, the right steering control unit 128 (FIG. 2) is actuated to provide an electrical steering command signal to the summing amplifier 162. This steering command signal opposes the ratio command signal and is effective to cause activation of the valve assembly 56 to reduce the output speed of the right hydrostatic transmission 18.

If the vehicle 10 is proceeding in a forward direction, the ratio command signal transmitted over the lead 164 to the summing amplifier 162 has a positive voltage of a magnitude determined by the extent of upward (as viewed in FIG. 2) movement of the wiper 142 relative to the resistance 144. Actuation of the right steering control unit 128 results in the transmission of a negative voltage steering command signal to the summing amplifier 162 over a lead 180 from a steering command signal generator 184. This causes the summing amplifier 162 to transmit a reduced voltage control signal to effect a reduction in the speed of the right transmission 18 and a turning of the vehicle toward the right.

The right steering or secondary command signal generator 184 is a potentiometer having a resistance 186 and a wiper 188. When the wiper 188 is in the position shown in FIG. 2 it is connected directly with ground so that the steering command signal generator 184 is ineffective to transmit a signal to the summing amplifier 162. Upon actuation of the steering command signal generator 184 by moving the wiper 188 relative to the resistance 186, a steering command signal is transmitted over a lead 180 to the amplifier 162. This steering command signal modifies the ratio command signal transmitted over lead 172 to reduce the voltage of the control signal transmitted from the summing amplifier 162 to the valve assembly 56. Upon such a reduction in voltage, the valve assembly 56 is operated to effect a reduction in the output speed of the hydrostatic transmission 18.

The steering command signal generator 184 is energized with a voltage which is of an opposite polarity and twice as great as the voltage of the ratio command signal transmitted over the lead 164. To this end, the ratio command signal voltage is transmitted to an inverting amplifier 192 having a voltage gain of two. The output from the inverting amplifier 192 is conducted to the resistance 186 in the steering command signal generator 184. Therefore when the wiper 188 is moved along the resistance 186, the voltage transmitted over the lead 180 to the summing amplifier 162 is of the opposite polarity to the voltage of the ratio command signal conducted over the lead 164. This results in a reduction in the voltage of the output signal from the summing amplifier 162 with a resulting reduction in the output speed of the hydrostatic transmission 18.

Since the inverting amplifier 192 has a voltage gain of two, the resistance 186 is energized with a voltage of an absolute value which is twice as great as the voltage of the command signal. Therefore, the steering command signal generator 184 can be actuated to an extent such that the output speed of the hydrostatic transmission 18 is equal to and in a direction opposite from the output speed of the hydrostatic transmission 20 to effect a spin turning of the vehicle 10. Thus, if the vehicle 10 is moving forward at a predetermined speed and the wiper 188 in the steering command signal generator 184 is moved to a fully actuated position, that is fully downward as viewed in FIG. 2, the hydrostatic transmission 18 is effective to drive the right track of the vehicle in the reverse direction at the same speed as in which the hydrostatic transmission 20 is driving the left track of the vehicle in the forward direction. This results in a spin turning of the vehicle about its center.

The left steering control unit 130 is of generally the same construction as the right steering control unit 128 and includes a steering command signal generator 196 which is connected with the summing amplifier 166. In the illustrated embodiment of the invention, the left steering command signal generator 196 is a potentiometer having a resistance 198 which is energized from the output of the inverting amplifier 192. Therefore, upon movement of a wiper 200 to a fully displaced condition, the voltage of the steering command signal conducted to the summing amplifier 166 is of an opposite polarity and twice as great as the ratio command signal conducted to the summing amplifier 166 over the lead 168. Of course, this results in a reversal in the direction of operation of the hydrostatic transmission 20 to effect a spin turning of the vehicle to the left.

Straight Tracking Controls

When the vehicle 10 is moving along a straight path in either the forward or reverse direction, a straight tracking control unit 134 (FIG. 2) is effective to prevent variations in the output speeds of the two hydrostatic transmissions 18 and 20 due to variations in the load applied to the transmissions. The straight tracking control unit 134 includes a right speed sensing unit 210 which provides an electrical speed signal which varies as a function of variations in the output speed in the right hydrostatic transmission 18. The speed sensing unit 210 includes a toothed wheel 212 which cooperates with a digital pulse pickup head 214 to provide a speed signal having a value which varies as a function of variations in the output speed of the hydrostatic transmission 18. In the illustrated embodiment of the invention, the speed signal comprises a series of pulses having a pulse rate which varies as a function of variations in the output speed of the hydrostatic transmission 18.

A speed sensing unit 220 is effective to provide a speed sensing signal which varies as a function of variations in the output speed of the left hydrostatic transmission 20. The speed sensing unit 220 is of the same construction as the speed sensing unit 210 and includes a toothed wheel 222 which is driven at the same speed as the output shaft 40 of the hydrostatic transmission 20. A digital pulse pickup head 224 cooperates with the toothed wheel 222 to provide a speed signal having a pulse rate which varies as a function of variations in the output speed of the hydrostatic transmission 20.

A comparator 228 compares the speed signals from the right and left speed sensing units 210 and 220 and provides a digital signal to a digital-to-analog converter 230 when the output speed of one hydrostatic transmission is different than the output speed of the other hydrostatic transmission. The comparator 228 includes a bidirectional counter 234. During forward movement of the vehicle 10, a directional switching network 236 is effective to transmit a speed signal from the right speed sensing unit 210 to the up terminal of the counter 234 and to transmit the speed signal from the left speed sensing unit 220 to the down terminal of the counter 234. Similarly during reverse operation of the vehicle 10, the switching network 236 is effective to transmit the speed signal from the right speed sensing unit 210 to the down terminal of the counter 234 and the speed signal from the left speed sensing unit 220 to the up terminal of the counter 234.

The switching network 236 is actuated between the forward and reverse operating conditions by the polarity of directional signal transmitted over a lead 240 to the switching network 236. During forward operation of the vehicle 10 the ratio command signal has a positive polarity and the signal transmitted over the lead 240 to the counter 236 has a positive polarity. During reverse operation of the vehicle 10 the ratio command signal has a negative polarity and the signal transmitted to the switching network 236 over the lead 240 has a negative polarity. This shift in polarity with a reversal in the direction of vehicle movement effects the aforementioned switching of the speed signals between the up and down terminals of the counter 234.

When the right and left hydrostatic transmissions 18 and 20 have the same output speed, the pulse rates of the speed signals applied to the up and down terminals of the bidirectional counter 234 are equal. Therefore the counter 234 has a steady output to the digital-to-analog converter 230. If the forward output speed of the right transmission 18 exceeds the forward output speed of the left transmission 20, the relatively high pulse rate of the speed signal from the speed sensing unit 210 pulses the counter 234 upwardly so that the digital-to-analog converter 230 has an increasing output. This increasing output is transmitted to an inverting amplifier 244. The decreasing output signal from the inverting amplifier 244 opposes the positive ratio command signal transmitted to the summing amplifier 162 from the signal generator 140. Therefore, the output voltage of the summing amplifier 162 is decreased to effect operation of the valve assembly 56 to decrease the forward output speed of the faster right hydrostatic transmission 18.

In addition to decreasing the output speed of the faster right transmission 18, the forward output speed of the slower left transmission 20 is increased. Thus, the positive output signal from the digital-to-analog converter 230 is transmitted through a noninverting amplifier 248 to the summing amplifier 166. Since the ratio command signal has a positive polarity, the positive straight tracking signal from the noninverting amplifier 248 and the ratio command signal result in an increase in the output voltage of the summing amplifier 166. This effects operation of the valve assembly 58 to increase the forward output speed of the slower left transmission 20.

If the vehicle 10 should be moving forward and encounters a condition in which the load on the right transmission 18 increases so that its output speed decreases relative to the load on the left transmission 20, the speed signal from the left speed sensing unit 220 drives the counter 234 downward so that the digital-to-analog converter 230 has a negative output signal. This negative output signal is transmitted by the noninverting amplifier 248 to the summing amplifier 166 where it opposes the positive ratio command signal to decrease the voltage transmitted to the valve assembly 58. This actuates the valve assembly 58 to decrease the forward output speed of the faster left hydrostatic transmission 20.

When the left hydrostatic transmission 20 has a greater forward output speed, the decreased output signal from the digital-to-analog converter 230 is effective to increase the output speed of the slower right hydrostatic transmission 18. Thus, the decreased output signal is inverted by the amplifier 244 and is combined with the positive ratio command signal by the summing amplifier 162. This results in operation of the valve assembly 56 to increase the forward output speed of the slower right hydrostatic transmission 18.

When the vehicle 10 is being operated in a reverse direction, the ratio command has a negative polarity. This results in a polarity signal being transmitted over the lead 240 to the switching network 236 to effect transmission of the speed signal from the right speed sensing unit 210 to the down terminal of the counter 234 and to effect transmission of the speed signal from the left speed sensing unit 220 to the up terminal of the counter 234. If the reverse speed of the right hydrostatic transmission 18 exceeds the reverse speed of the left hydrostatic transmission 20, the value of the speed sensing signal transmitted to the down terminal of the counter 234 exceeds the value of the speed sensing signal transmitted to the up terminal. The output from the counter 234 then effects activation of the digital-to-analog converter 230 to provide an output signal having a decreasing value. This output signal is inverted to an increasing value by the amplifier 244 and transmitted to the summing amplifier 162. Since the ratio command signal has a negative polarity during reverse operation of the vehicle, the increased signal transmitted to the summing amplifier 162 results in activation of the valve assembly 56 to decrease the faster reverse operating speed of the right hydrostatic transmission 18. In addition, the decreased straight tracking error signal is transmitted to the summing amplifier 166 where it is combined with the negative ratio command signal to effect operation of the valve assembly 58 to increase the reverse operating speed of the slower left hydrostatic transmission 20.

During turning of the vehicle 10 it is necessary to disable the straight tracking control unit 134. Thus, activation of either the right or left steering units 128 or 130 results in the transmission of a signal to a disabling circuit 252. Upon receiving a signal from one of the steering command signal generators 184 and 196, the disabling circuitry 252 transmits a signal over the lead 254 to a hold terminal of the counter 234 and holds the counter in a fixed output condition until the turn is completed.

Anti-stall Control

Under certain operating conditions the hdyrostatic transmissions 18 and 20 may tend to transmit excessive loads to the engine 16. In order to prevent overloading of the engine 16, an anti-stall assembly 136 is provided to effect a reduction in the load on the engine 16 when an impending stall condition is present. The anti-stall assembly 136 effects a reduction in the load on the engine 16 by modifying the ratio command signal transmitted to decrease the displacement ratios of the hydrostatic tansmissions 18 and 20.

The anti-stall assembly 136 includes an engine speed signal generator 258 and a throttle setting signal generator 260. A negative throttle setting signal and positive engine speed signal are summed by an amplifier 262. If the value of the engine speed signal decreases during forward operation of the vehicle 10, a negative signal is transmitted over a lead 264 and through a relay 266 to the summing amplifier 158. Since the ratio command signal is positive during forward operation of the vehicle 10, the negative anti-stall signal opposes the ratio command signal so that a ratio command signal of a reduced value is transmitted from the summing amplifier 158 over the lead 164 to the summing amplifier 162 and over the lead 168 to the summing amplifier 166. Of course, this effects operation of the two valve assemblies 56 and 58 to reduce the displacement ratios and output speeds of the right and left hydrostatic transmissions 18 and 20 and thereby reduces the load on the engine 16.

As the load on the engine 16 is decreased, its output speed increases with a resulting increase in the value of the speed signal trasmitted to the summing amplifier 262. When the value of the speed signal is equal to the value of the throttle setting reference signal, the engine speed error signal from the amplifier 262 is reduced to zero and is ineffective to modify the ratio command signal.

If during operation of the vehicle in a forward direction the engine speed signal should exceed the throttle reference signal, the amplifier 262 provides a positive output signal. Of course at this time the hydrostatic transmissions 18 and 20 are applying a very light load to the engine 16 and there is no danger of its stalling. Therefore a diode 268 is provided to block the transmission of the positive engine speed output signal to the summing amplifier 158 and the ratio command signal is not modified by a signal from the anti-stall assembly 136.

Upon operation of the vehicle 10 in a reverse direction, the relay 266 is actuated to connect a lead 270 with the summing amplifier 158. Therefore, a positive polarity engine speed error signal is transmitted from the inverting amplifier 272 to the summing amplifier 158 when the engine speed signal falls below the throttle reference signal due to overloading of the engine 16. This positive engine speed error signal opposes the negative ratio command signal with a resulting decrease in the speed of operation of the vehicle 10 in a reverse direction. A diode 276 prevents the transmission of negative engine speed error signals to the summing amplifier 158 when the vehicle is being operated in a reverse direction.

GENERAL DESCRIPTION OF THE EMBODIMENT OF FIGS. 3–8

Control circuitry forming a second and preferred embodiment of the invention is illustrated in FIGS. 3 through 8. The control circuitry of the embodiment of the invention illustrated in FIGS. 3–8 functions in a manner generally similar to that of the control circuitry of the embodiment of the invention illustrated in FIG. 2. Thus, the control circuitry in the second embodiment of the invention includes a ratio command signal generator 300 (see FIG. 3) which is manually operable to provide an output signal indicative of the desired input to output speed ratio of the hydrostatic transmissions 18 and 20. An acceleration limiting circuit 302 limits the rate of change of the main or ratio command signal.

Left and right steering signal generators 306 and 308 (FIG. 4) are manually operable to provide steering signals to effect turning of the vehicle to either the left or right. The steering signals from the right steering signal generator 308 and the ratio command signals from the ratio command signal generator 300 are transmitted to right tansmission control circuitry 312 (FIG. 5) to effect variations in the output speed of the right hydrostatic transmission 18. Similarly, steering signals from the left steering signal generator 306 (FIG. 4) and from the ratio command signal generator 300 are transmitted to left transmission control circuitry 316 (See FIG. 6) to vary the output speed of the left hydrostatic transmission 20.

Straight tracking control circuitry 320 (FIG. 7) is advantageously provided in association with the control circuitry of FIGS. 3–6 to equalize the output speeds of the hydrostatic transmissions 18 and 20 during forward or reverse movement of the associated vehicle. Upon turning of the vehicle, a signal from one of the steering control signal generators 306 or 308 is utilized to effect a disabling of the straight tracking control circuitry to enable the vehicle to be turned. In addition, anti-stall circuitry 324 (see FIG. 8) may be provided to prevent overloading of the engine 16.

Ratio Command Control Circuitry

The ratio command signal generator 300 (FIG. 3) includes a potentiometer 330 having a wiper 332 which is moved relative to a resistance 334 by a control handle, similar to the control handle 68 of FIG. 1. When the wiper 332 is in a centered or neutral position, the ratio command signal transmitted over lead 336 has a zero voltage value. Movement of the wiper 332 downwardly (as viewed in FIG. 3) from the illustrated neutral position toward a forward actuated position effects a simultaneous increase in the output speeds of both of the hydrostatic transmissions 18 and 20. As this occurs, a command signal of a negative polarity and a value determined by the extent of movement of the wiper 332 is transmitted over the lead 336. Similarly, when the vehicle is to be operated in a reverse direction, a command signal of a positive polarity and a value determined by the extent of upward (as viewed in FIG. 3) movement of the wiper 332 is transmitted over the lead 336.

Since the absolute value of the command signal varies as a direct function of the extent of movement of the wiper 332 from the illustrated neutral position, the command signal varies in the manner illustrated schematically by the input-output function tramsfer graph 340. In order to promote accurate control of the hydrostatic transmissions 18 and 20 and to prevent excessive responses to movement of the wiper 332 about the neutral position, the ratio command signal is shaped by control circuitry 344 to reduce the gain around neutral and increase the gain away from neutral so that the ratio command signal transmitted from the circuitry 344 varies in the manner illustrated by the input-output function transfer graph 346.

The command signal shaping circuitry 344 receives the ratio command signal from an inverting amplifier 350. Until one diode of a pair of Zener diodes 354 and 356 breaks down, the command signal is conducted through a resistance 358. However, when the voltage across the Zener diodes 354 and 356 reaches a predetermined value, the resistance 358 is effectively short circuited so that the input signal to an inverting amplifier 360 varies as a direct function of variations in the ratio command signal. Until the Zener diodes 354 and 356 are broken down, the ratio command signal from the amplifier 360 will vary as a direct function of variations in the position of pointer 332.

In order to prevent excessive rates of vehicle acceleration or deceleration, the rate of change of the ratio command signal is limited by the rate limiter circuitry 302. The rate limiter circuitry 302 is a low pass filter having a low gain for high frequencies and a high gain for low frequencies. The input signal is transmitted to the integrator 376 from an inverting amplifier 366 having a positive feedback input 368. The signal is conducted through a variable resistor 372 and a fixed resistance 374 to the inverting terminal of an amplifier 376. The inverting terminal of the amplifier 376 is connected to the output of the amplifier through a condesner 378. If it is desired to disable the rate limiter 302, it is merely necessary to close a switch 380 to short out the relatively large resistance 372.

Figure 8:
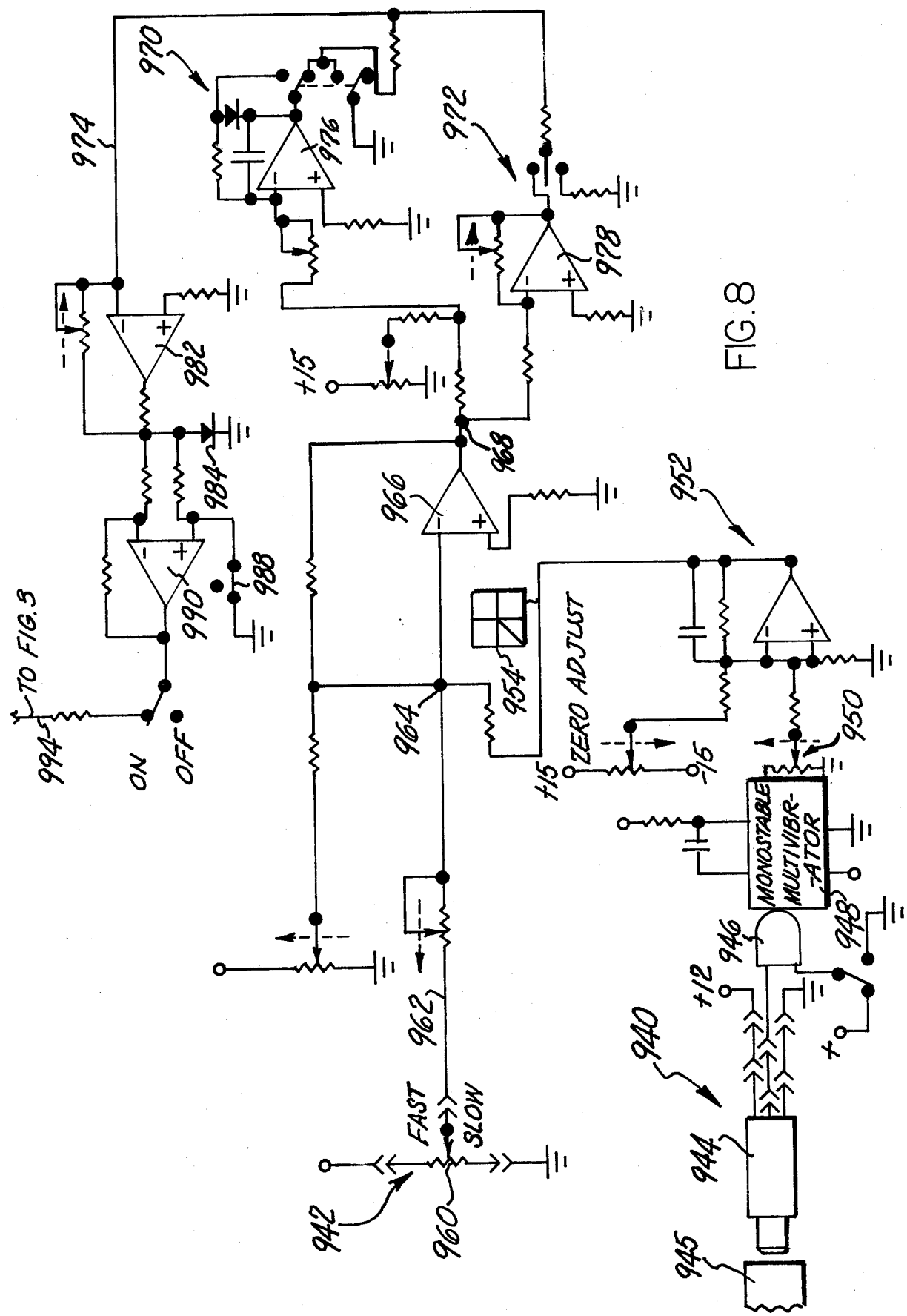

The ratio command signal is transmitted from the rate limiter circuitry 302 to a summing junction 384 where, if an impending stall is present, it is modified by an anti-stall signal from the anti-stall circuitry 324 of FIG. 8. Assuming that an impending stall condition is not present, the ratio command signal is transmitted without modification to the inverting terminal of an amplifier 388.

During operation of the vehicle in a forward direction, the amplifier 388 (FIG. 3) has a positive output and during reverse operation of the vehicle it has a negative output. To prevent spurious negative signals during forward operation of the vehicle, a switch 392 conducts the output to a diode 394. Similarly, during reverse operation of the vehicle the switch 392 is effective to transmit any spurious positive signals to ground through a diode 398.

Figure 3:
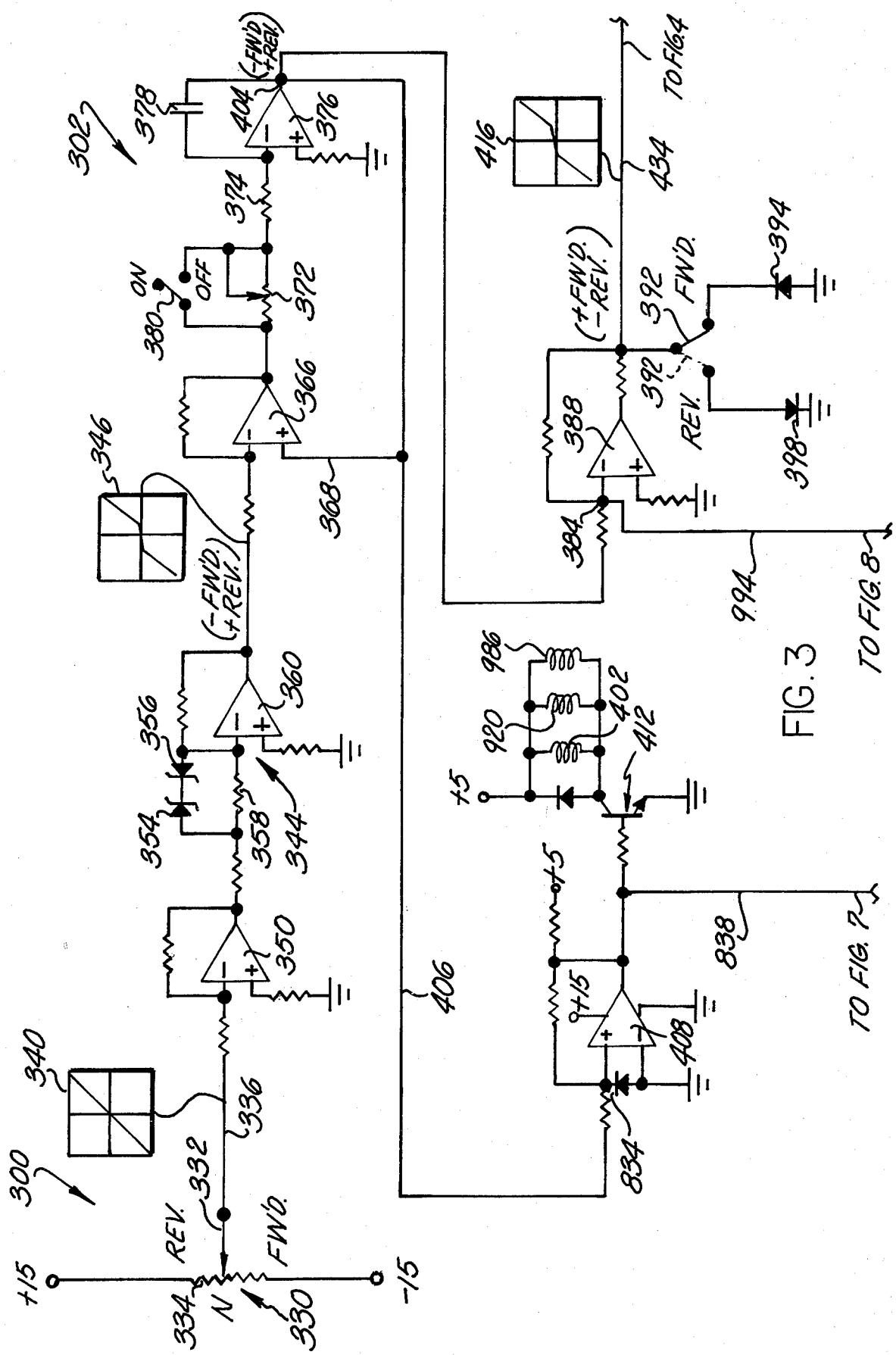
FIG. 3–8 are schematic illustrations of electrical control circuitry utilized in a second embodiment of the invention, FIG. 3 being a schematic illustration of ratio command and acceleration limiting control circuitry.

The switch 392 is operated between the illustrated forward operating position and the reverse operating position by a relay coil 402 (FIG. 3). During forward operation of the vehicle, a negative signal is transmitted from a junction 404 along a lead 406 to the noninverting terminals of an amplifier 408. During forward operation, the negative output signal from the amplifier 408 renders a transistor 412 nonconducting so that the relay coil 402 is deenergized and the switch 392 is in the forward position illustrated in FIG. 3. Upon operation of the command signal generator 330 to provide a reverse command output signal, the positive output of the amplifier 376 is conducted to the amplifier 408 and is effective to render the transistor 412 conducting. This results in energization of the relay coil 402 to actuate the switch 392 from the illustrated forward position to the reverse position in which positive signals from the amplifier 388 are transmitted to ground through the diode 398.

Figure 4:
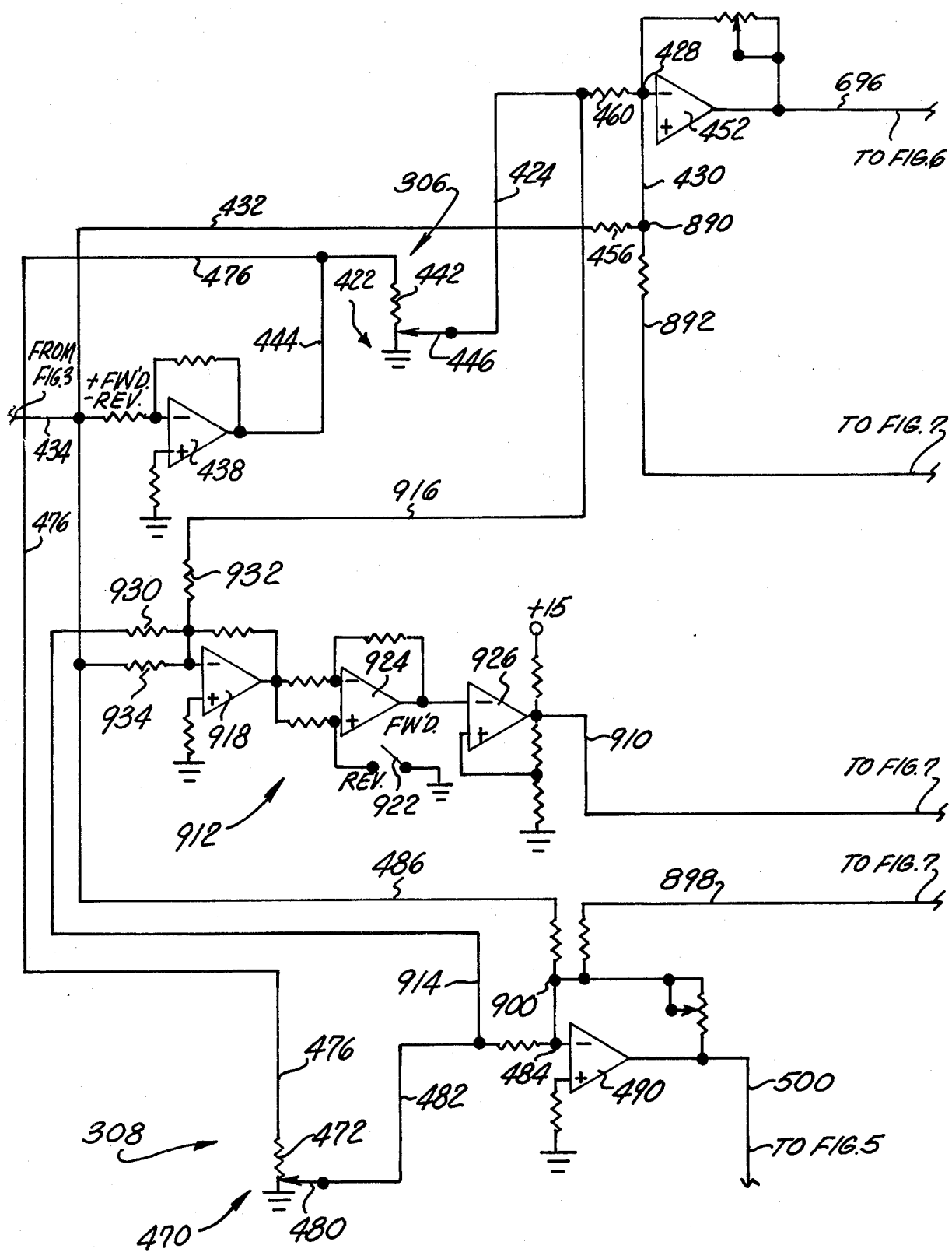

During operation of the vehicle 10, a ratio command signal is transmitted from the amplifier 388 to the left and right steering control circuits 306 and 308 (as viewed in FIG. 4). The ratio command signal has a positive polarity when the vehicle is being operated in a forward direction and a negative polarity when the vehicle is being operated in a reverse direction. The absolute value of the ratio command signal will vary as a function of the extent of movement of the potentiometer wiper 332 in the manner illustrated by the input-output function transfer graph 416 (see FIG. 3). In the dead band range close to neutral, relatively large movement of the wiper 332 is required to effect a relatively small change in the ratio command signal. As the wiper 332 is moved out of the dead band range, each increment movement of the pointer is effective to cause a somewhat larger change in the ratio command signal. Upon the occurrence of a change in the ratio command signal, the left and right transmission control circuitry 312 and 316 (see FIGS. 5 and 6) are activated to effect equal variations in the output speeds of the hydrostatic transmissions 18 and 20. The magnitude of the change in the output speeds of the hydrostatic transmissions 18 and 20 vary as a direct function of variations in the absolute value of the command signal voltage.

Steering Control Circuitry

The right and left steering controls 308 and 306 (FIG. 4) are selectively actuatable to decrease the output speed of one of the hydrostatic transmissions 18 or 20 relative to the other hydrostatic transmission to thereby effect a turning of the vehicle. Thus, upon actuation of a steering signal generator 422 in the left steering control circuitry 306, a steering or secondary command signal is transmitted over a lead 424 to a summing junction 428. In addition to the steering command signal, the ratio command signal is transmitted to the summing junction 428 over leads 430, 432 and 434 from the amplifier 388 of FIG. 3.

The steering command signal conducted to the junction 428 (FIG. 4) is of a polarity opposite from the polarity of the ratio command signal. Therefore the steering command signal opposes the ratio command signal with a resulting reduction in the output speed of the left hydrostatic transmission 20. The amount of the reduction in the output speed of the left hydrostatic transmission 20 depends upon the absolute value of the steering command signal. The value of the steering command signal varies as a direct function of variations in the extent to which the steering signal generator 422 is actuated.

To provide for a steering signal which is of a polarity opposite from the polarity of the ratio command signal, the ratio command signal is conducted to the inverting terminal of an amplifier 438. The left steering signal generator 422 is a potentiometer having a resistance 442 which is connected with the output of the amplifier 438 by a lead 444. Therfore, a voltage of a magnitude equal to the magnitude of the voltage of the ratio command signal and of the opposite polarity from the polarity of the ratio command signal is applied across the resistance 442 to ground. When a wiper 446 is in the position illustrated in FIG. 4, ground is conducted over lead 424 to the summing junction 428 so that the uneffected ratio command signal is transmitted to the inverting terminal of an amplifier 452.

When the vehicle is to be turned toward the left, the pointer 446 is moved relative to the resistance 442 to provide a steering command signal of a polarity opposite that of the ratio command signal. The ratio command signal is conducted through a resistance 456 to the summing junction 428. The resistance 456 is more than twice as great as a resistance 460 through which the steering signal is conducted. Therefore the steering command signal transmitted to the summing junction 428 can be increased to an absolute value which is at least twice as great as the command signal upon movement of the potentiometer pointer 446 upwardly (as viewed in FIG. 4) to a fully actuated position. This enables the output of the amplifier 452 to be changed from the voltage of one absolute value and polarity to a voltage of the the opposite polarity and the same absolute value upon sufficient actuation of the steering command signal generator 422. It should be noted that if the absolute magnitude of the steering command signal voltage reaches a value which is twice as great as the absolute magnitude of the ratio command signal, a spin turning of the vehicle will be achieved in the manner previously explained in connection with the embodiment of the invention illustrated in FIG. 2.

The right steering control circuitry 308 has the same construction as the left steering control circuitry 306 and includes a right steering command signal generator 470. The right steering command generator 470 (FIG. 4) includes a resistance 472 which is energized with a voltage of the opposite polarity and same absolute value as the ratio command signal. Thus, the output of the amplifier 438 is conducted to the right steering command signal generator 472 over leads 444 and 476. Upon movement of a pointer 480 relative to the resistance 472 a steering command signal is transmitted over lead 482 to a summing junction 484. The ratio command signal is conducted to the summing junction 484 over leads 434 and 486. The output of the summing junction 484 is applied to the inverting terminal of an amplifier 490 which is connected with the right transmission control circuitry 312 of FIG. 5.

RIGHT TRANSMISSION CONTROL CIRCUITRY

The right transmission control circuitry 312 (FIG. 5) is effective to compare the actual displacement of the right pump unit 22 and right motor unit 26 with a desired displacement corresponding to the magnitude of a control signal conducted to the control circuitry 312 from the amplifier 490 of FIG. 4 over a lead 500. Assuming that the right steering control circuitry 308 has not been actuated and that an impending stall condition is not present, the signal transmitted over the lead 500 is the ratio command signal indicative of a desired displacement of both the pump unit 22 and motor unit 26.

A signal generator 502 provides a feedback signal which is indicative of the position of the swashplate in the pump unit 22. Since the displacement of the pump unit 22 varies as a direct function of variations in the position of the swashplate, the feedback signal from the signal generator 502 varies as a direct function of variations in the displacement of the pump unit 22. The feedback signal from the signal generator 502 is conducted to the electrical circuitry 510 which is effective to compare the ratio command signal transmitted over the lead 500 and the feedback signal to determine if the displacement of the pump unit 22 corresponds to the ratio command signal.

If the feedback signal from the signal generator 502 and the ratio command signal do not correspond to the same displacement of the pump unit 22, the electrical control circuitry 510 effects energization of either a forward pilot valve solenoid 512 or a reverse pilot valve solenoid 514. Energization of the forward pilot valve solenoid 512 effects operation of a directional control valve in the control valve assembly 56 from a neutral position blocking fluid flow to and from the pump actuator assembly 42 to an actuated condition porting high pressure fluid to the actuator assembly 42 to increase the displacement of the pump unit 22 during forward operation of the vehicle 10 or decrease the displacement of the pump unit 22 during reverse operation of the vehicle 10. Similarly, energization of the pilot valve solenoid 514 effects operation of the directional control valve from a neutral condition blocking fluid flow to and from the pump actuator assembly 42 to a reverse actuated condition in which the actuator assembly 42 is effective to increase the displacement of the pump unit 22 during reverse operation of the hydrostatic transmission 18 and to decrease the displacement of the pump unit 22 during forward operation of the hydrostatic transmission 18. If there is a relatively large difference between the displacement indicated by the ratio command signal and the feedback signal from the signal generator 502, the rate control valve solenoid 518 is energized to effect opening of a rate control valve to port fluid at a relatively high flow rate to the directional control valve to thereby effect rapid operation of the actuator assembly 42.

Figure 5:
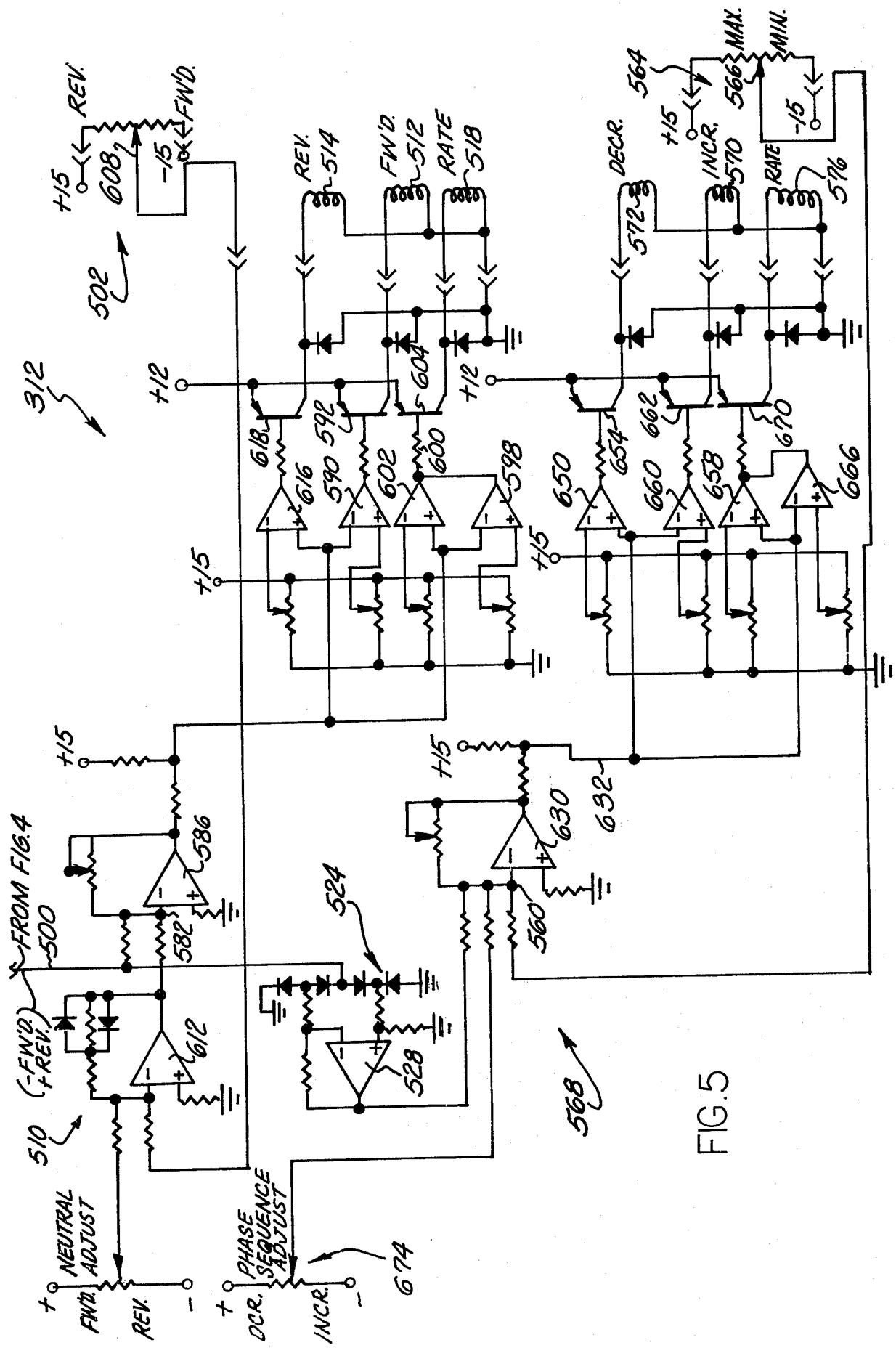

If the ratio command signal generator 300 (see FIG. 3) is actuated to a relatively large extent from the illustrated neutral position, the ratio command signal has a relatively high voltage of either a positive or negative polarity. The relatively high absolute value of the ratio command signal is transmitted over the lead 500 to a bridge rectifier circuit 524 (FIG. 5). The output voltage from the bridge rectifier circuit 524 is transmitted to an amplifier 528 which is connected in series with a summing junction 560. The summing junction 560 is connected with a feedback signal generator 564 having a wiper 566 which is connected with the swashplate of the motor unit 26. Therefore, the wiper 566 moves with the motor swashplate so that the feedback signal from the signal generator 564 varies as a direct function of variations in the displacement of the motor unit 26.

Electrical control circuitry 568 is effective to compare the magnitude of the ratio command signal with the motor displacement feedback signal transmitted from the signal generator 564 to determine if the displacement of the motor unit 26 corresponds to the ratio command signal. If the motor unit displacement does not correspond to the ratio command signal, the electrical control circuitry 568 energizes either a pilot valve solenoid 570 to effect an increase in the displacement of the motor unit 26 or a pilot valve solenoid 572 to effect a decrease in the displacement of the motor unit 26. If there is a relatively large difference between the displacement indicated by the ratio command signal and the motor displacement feedback signal from the signal generator 564, the electrical control circuitry 568 effects energization of a rate control valve solenoid 576 to effect high speed operation of the motor actuator assembly 48 to quickly vary the displacement of the motor unit 26.

Assuming that the vehicle 10 is moving straight forward and the ratio command signal generator 330 (FIG. 3) is actuated to increase the forward speed by a relatively small amount, there is relatively small change in the value of the ratio command signal. Therefore, the magnitude of the negative polarity ratio command signal transmitted to a summing junction 582 (FIG. 5) is increased by a small amount. This results in a small increase in the negative value of the signal applied to an inverting terminal of the amplifier 586. The increase in magnitude of the positive polarity voltage output of the amplifier 586 is applied to the inverting terminal of an amplifier 590. This causes the amplifier 590 to render a transistor 592 conducting to energize the forward pilot valve solenoid 512. Energization of the forward pilot valve solenoid 512 effects operation of the pump actuator assembly 42 to increase the displacement and output speed of the pump unit 22 (FIG. 1).

The increased voltage of the ratio command signal is also applied to an inverting terminal of an amplifier 598 (FIG. 5). If the displacement of the right pump unit 22 is less than the displacement indicated by the ratio command signal by more than a predetermined amount, the voltage of the error signal conducted to the inverting terminal of the amplifier 598 results in the application of relatively low voltage to an output lead 600. This relatively low voltage dominates the output of an amplifier 602 to render a transistor 604 conducting. This energizes the rate control valve solenoid 518 to open the rate control valve and effect a relatively high rate of fluid flow to the pump swashplate actuator assembly 42. Since the directional control valve has been actuated to a forward operating condition by energization of the solenoid 512, the pump swashplate is moved at a relatively high speed to increase the forward displacement of the pump unit 22.

As the forward displacement of the pump unit 22 approaches the displacement indicated by the ratio command signal, the wiper 608 in the feedback signal generator 502 is moved by the pump swashplate to increase the absolute value of a negative polarity feedback signal transmitted to an inverting terminal of an amplifier 612. This results in an increase in the positive voltage transmitted from the amplifier 612 to the summing junction 582. Therefore, the absolute value of the signal applied to the inverting terminal of the amplifiere 586 is decreased with a resulting decrease in the error signal transmitted to the amplifier 598.

When the error signal falls to a value of a predetermined magnitude, the voltage transmitted to the amplifier 598 is less than its threshold voltage and the transistor 604 is rendered nonconducting. This results in deenergization of the rate control valve solenoid 518. When the rate control valve solenoid 518 is closed, the rate of fluid flow to the pump actuator assembly 42 (FIG. 1) is decreased to enable it to slowly and accurately position the swashplate of the pump unit 22.

When the forward operating displacement of the pump unit 22 is to be decreased, the ratio command signal generator 300 (FIG. 3) is again actuated to effect a decrease in the absolute value of the negative polarity ratio command signal transmitted to the summing junction 582 (FIG. 5). Therefore the positive polarity feedback signal from the amplifier 612 dominates. The resulting negative output signal from the inverting amplifier 586 is conducted to the noninverting terminal of an amplifier 616. This decreases the output voltage signal from the amplifier 616 and renders a transistor 618 conducting to energize the reverse pilot valve solenoid 514. Upon energization of the reverse pilot valve solenoid 514, the directional control valve is operated to a reverse actuated condition to effect operation of the actuator assembly 42 to reduce the forward operating displacement of the pump unit 22.

The negative voltage signal is also applied to the noninverting terminal of the amplifier 602. If the actual displacement of the pump unit 22 exceeds the displacement indicated by the ratio command signal by more than a predetermined amount, the negative error signal voltage will exceed a reference voltage by an amount sufficient to exceed the threshold level of the amplifier 602. When this occurs, the output of the amplifier 602 dominates the output of the amplifier 598 and renders the transistor 604 conducting. This energizes the rate control valve solenoid 518 to operate the rate control valve. Operation of the rate control valve results in a relatively high speed operation of the actuator assembly 42 to quickly reduce the displacement indicated by the ratio command signal.

When the forward operating displacement of the pump unit 22 is just slightly greater than the displacement indicated by the ratio command signal, the error signal voltage is decreased to a voltage which is less than the threshold voltage of the amplifier 602 (FIG. 5) so that the transistor 604 is rendered nonconducting. This results in deenergization of the rate control valve solenoid 518 and relatively slow speed operation of the actuator assembly 42 to slowly move the pump swashplate through the final distance to the position corresponding to the ratio command signal. When the swashplate reaches this position, the error signal voltage transmitted from the amplifier 586 is again equal to a reference voltage and the output in the amplifier 616 becomes positive with a resulting deenergization of the pilot valve solenoid 514.

When the displacement of the motor unit 26 is the same as the displacement indicated by the ratio command signal, amplifier 630 (FIG. 5) provides a reference voltage on a lead 632. When the ratio command signal corresponds to a relatively low output speed, the absolute magnitude of the command signal voltage is less than a low voltage corresponding to the maximum displacement position of the motor swashplate. At this time, the pilot valve solenoid 570 is energized so that fluid under pressure is ported to the motor actuator assembly 48 to urge the motor swashplate against a maximum displacement condition stop. Thus, when the ratio command signal corresponds to a relatively low speed in either the forward or reverse directions, an error signal voltage greater than a reference voltage is provided on the lead 632. This relatively high voltage causes an amplifier 660 to render a transistor 662 conducting. This results in energization of the solenoid 570 to maintain a control valve actuated to port fluid under pressure to the motor actuator assembly 48.

Upon rapid movement of the control handle 68 (see FIG. 1) from a neutral position to a fully forward actuated position with the pump unit 22 in a neutral condition, the solenoid 512 (FIG. 5) is energized to effect operation of a directional control valve to a forward actuated condition in the manner previously explained. At this time, the increased absolute value of the ratio command signal is transmitted to the rectifier bridge 524 and results in an increase in the positive voltage output from the amplifier 528. Of course, this decreases the voltage of the output from the inverting amplifier 630 and lowers the voltage on the lead 632. The voltage on the lead 632 is applied to the amplifier 660 to render transistor 662 nonconducting and effects deenergization of the solenoid 570. In addition, the decreasing voltage is applied to the noninverting terminal of an amplifier 650 to render a transistor 654 conducting. This effects energization of the pilot valve solenoid 572 and operation of a main control valve to port fluid to the motor actuator assembly 48 to effect a decrease in the displacement of the motor unit 26 as the displacement of the pump unit 22 is being increased.

The decreasing error signal voltage is also applied to the noninverting terminal of an amplifier 658. If the displacement of the motor unit 26 is less than the displacement indicated by the ratio command signal by more than a predetermined amount, the voltage of the error signal conducted to the noninverting terminal of the amplifier 666 is of a sufficient magnitude to cause the output voltage of the amplifer to change to a relatively low voltage. This relatively low voltage dominates the output of the amplifier 666 to render a transistor 670 conducting. This energizes the rate control valve solenoid 576 to effect high speed operation of the motor actuator assembly 48.

As the displacement of the motor unit 26 approaches the displacement indicated by the ratio command signal, the magnitude of the voltage error signal increases. When the error signal voltage is only slightly less than a reference voltage, the error signal voltage rises to a voltage above the threshold voltage of the amplifier 658. This results in the transistor 670 being rendered nonconducting and the rate control valve solenoid 576 deenergized. The actuator assembly 48 is then operated to slowly move the motor swashplate toward the desired displacement position.

When the swashplate of the motor unit 26 reaches the position corresponding to the ratio command signal, the absolute magnitude of a negataive voltage feedback signal from the signal generator 564 and a negative voltage signal from a phase sequence adjust potentiometer 674 offsets the positive voltage output of the rectifier 524. This results in the error signal from the amplifier 630 being equal to a reference voltage. Therefore the output from the amplifier 650 becomes positive and the transistor 654 is rendered nonconducting. When this occurs, the solenoid 572 is deenergized and a main control valve is closed to block fluid flow to and from the motor actuator assembly 48.

When the high forward operating speed of the hydrostatic transmission 18 is to be decreased, the ratio command signal generator 300 is actuated toward the neutral position illustrated in FIG. 3. As this occurs, the absolute value of the ratio command signal voltage conducted to the bridge circuit 524 is decreased. This results in a decrease in the signal transmitted to the summing junction 560 from the voltage follower amplifier 528. The resulting increase in the voltage transmitted from the inverting amplifier 630 is applied to the inverting terminal of the amplifier 660. This decreases the output signal from the amplifier 660 to render the transistor 662 conducting. This results in energization of the pilot valve solenoid 570.

Energization of the pilot valve solenoid 570 causes a directional control valve to be actuated to a decelerate condition in which fluid under pressure effects operation of the actuator assembly 48 to increase the displacement of the motor unit 26. As the displacement of the motor unit 26 is increased, the output speed of the hydrostatic transmission 18 is decreased.

When the displacement of the motor unit 26 has been increased to a displacement corresponding to the ratio command signal voltage, the feedback signal from the signal generator 564 will be offset by the ratio command signal. When this occurs, the error signal applied to the lead 632 will be equal to the reference signal and the transistor 654 will again be rendered nonconducting to deenergize the solenoid 570.

The directional and rate control valves associated with the solenoids 512, 514, 518, 570, 572 and 576 are included in the valve assembly indicated at 56 in FIG. 1. The construction of these valves is the same as is disclosed in aforementioned U.S. Pat. application Ser. No. 446,658, filed Feb. 28, 1974, by Kenneth K. Knapp and Charles R. Cornell, and entitled "Hydrostatic Transmission Control System." In order to avoid prolixity of description, the disclosure in the aforementioned application should be considered as being incorporated herein in its entirety by this reference thereto.

LEFT TRANSMISSION CONTROL CIRCUITRY

The control circuitry 316 (FIG. 6) for the left hydrostatic transmission 20 is of the same construction and operates in the same way as the control circuitry 312 (FIG. 5) for the right hydrostatic transmission 18. The left hydrostatic transmission control circuitry 316 includes a pump swashplate position feedback signal generator 680 and a motor swashplate position feedback signal generator 682. The feedback signal from the pump swashplate position signal generator 680 is transmitted to a summing junction 686 by an amplifier 688 having an inverting terminal connected with the wiper 690 of the signal generator 680 by a lead 692. The ratio command signal is conducted to the summing junction 686 over a lead 696. It should be noted that the ratio command signal is transmitted to the lead 696 by way of the lead 434 (see FIGS. 3 and 4), the lead 432 (FIG. 4), the lead 430, and the inverting terminal of the amplifier 452. The ratio command signal from the amplifier 452 (FIG. 4) has a negative polarity during forward operation of the vehicle 10 and a positive polarity during reverse operation of the vehicle.

Upon actuation of the ratio command signal generator 300 (FIG. 3) to increase the forward output speed of the left hydrostatic transmission 20, the increase in absolute value of the forward ratio command signal results in an increase in the positive polarity of the command signal transmitted to the inverting terminal of amplifier 700 (FIG. 6) to render a transistor 704 conducting. This effects actuation of the forward pilot valve solenoid 706 to actuate a main directional control valve to a forward actuated position. Actuation of the main directional control valve ports high pressure fluid to the actuator assembly 44 (FIG. 1) to effect operation of a swashplate motor to increase the displacement of the pump unit 24.

If there is a relatively large change in the ratio command signal, the relatively large voltage conducted to the inverting terminal of an amplifier 710 (FIG. 6) overcomes the output of an amplifier 712 to render a transistor 714 conducting. This effects energization of a rate control pilot valve solenoid 716 to actuate a rate control valve and effect high speed operation of the swashplate motor to quickly move the pump swashplate toward the position corresponding to the ratio command signal. As the pump swashplate is moved by operation of actuator assembly 44, the wiper 690 in the feedback signal generator 680 is moved to increase the absolute value of the feedback signal. This feedback signal has a negative polarity during forward operation of the hydrostatic transmission 20.

As the displacement of the pump unit 24 is increased, an increasingly negative feedback signal from the signal generator 680 is transmitted to the inverting terminal of the amplifier 688 so that an increasingly positive signal is transmitted to the summing junction 686. This increasingly positive signal opposes the negative polarity ratio command signal. When the pump swashplate has been moved to a position corresponding to the negative ratio command signal, a reference voltage is conducted on a lead 772 to the amplifier 700 to render the transistor 704 nonconducting to deenergize the forward solenoid 706. The spring biased directional control valve then returns to its neutral position blocking fluid flow to and from the pump swashplate motor.

It should be noted that when the pump swashplate is approaching a position which is close to the position indicated by the ratio command signal, the voltage conducted over the lead 772 will be below the threshold voltage of the amplifier 710 and the transistor 714 will be rendered nonconducting to effect deenergization of the rate control valve solenoid 716. Therefore, the rate control valve is closed and the pump swashplate motor is operated at a relatively low speed to facilitate accurate positioning of the pump swashplate at a position corresponding to the ratio command signal.

During reverse operation of the vehicle 10, an increase in the positive polarity of the ratio command signal results in the transmission of an increasingly negative error signal to the noninverting terminal of an amplifier 726. The negative output signal from the amplifier 726 renders a transistor 728 conducting to energize a reverse pilot valve solenoid 730. Of course this operates the directional control valve to a reverse actuated position to port fluid to effect operation of the pump actuator assembly 44 to increase the reverse operating displacement of the pump unit 24. When a desired reverse operating displacement is obtained, the positive feedback signal from the feedback signal generator 680 is inverted by the amplifier 688 and overcomes the ratio command signal. The solenoid 730 is then deenergized.

When the hydrostatic transmission 20 has a relatively largeg output speed in either a forward or reverse direction, the swashplate of the motor unit 28 is moved to decrease the displacement of the motor unit. This occurs after the pump unit 24 has been actuated to a maximum displacement condition. Thus, upon slow actuation of the ratio command signal generator 300 from the neutral condition to a forward condition, the ratio command signal effects operation of the pump unit 24 to a maximum forward displacement condition in the manner previously explained. Once the pump unit 24 has obtained a maximum forward displacement condition, a swashplate motor for the motor unit 28 is activated to decrease the displacement of the motor unit to effect a further increase in the output speed of the hydrostatic transmission 20. If the command signal generator 300 were quickly operated to a maximum forward speed condition, the acceleration limiter 302 would allow the ratio command signal to change fast enough to effect a reduction in the displacement of the motor unit while the pump unit 24 was being operated to a maximum forward displacement condition.

The ratio command signal is conducted from the lead 696 (see FIG. 6) to a rectifier circuit 734 which is connected with an amplifier 736 which provides a positive output signal to a lead 740. This output signal varies as a direct function of variations in the magnitude of the ratio command signal and is conducted to a summing junction 742. A phase sequence adjust potentiometer 744 is connected with the summing junction 742 and provides a negative output signal which opposes the ratio command signal so that the displacement of the motor unit 28 does not vary until the ratio command signal is adjusted to correspond to a predetermined output speed.

Upon actuation of the ratio command signal generator 300 (FIG. 3) to adjust the ratio command signal to correspond to a relatively high forward output speed which requires decreasing the displacement of the motor unit 28, the increased positive ratio command signal applied to the inverting terminal of the amplifier 744 (FIG. 6) results in a decrease in the signal conducted to a noninverting terminal of amplifier 748. This results in rendering a transistor 752 conducting so that a solenoid coil 754 is energized to actuate a main control valve to port fluid to the motor actuator assembly 50 to move the swashplate and decrease the displacement of the motor unit 28. decrease If the variation in the command signal is relatively large, the relatively small signal conducted over a lead 756 to an amplifier 758 will fall below the threshold value of the amplifier to overcome an amplifier 760 to render a transistor 764 conducting. This effects energization of a rate control valve solenoid 768 to open a rate control valve and port fluid at a relatively high flow rate to the swashplate motor assembly to quickly effect movement of the motor swashplate toward a minimum displacement condition. As this is occurring, a wiper 770 in the motor swashplate position signal generator 682 transmits a feedback signal of an increasing absolute magnitude and negative polarity to the summing junction 742.

When the swashplate has been moved to a position closely approximating the position corresponding to the ratio command signal, the voltage transmitted over the lead 756 rises above the threshold voltage of the amplifier 758 to render the transistor 764 nonconducting. This effects deenergization of the rate control valve solenoid 768. Therefore, the actuator assembly 50 slowly moves the motor swashplate to a position corresporting to the value of the ratio command signal.

When the ratio command signal generator 300 is activated to effect a reduction in the output speed of the hydrostatic transmission 20, the absolute value of the ratio command signal decreases with a resulting reduction in the value of the positive polarity signal transmitted from the amplifier 736 to the summing junction 742. Since the wiper 770 in the feedback signal generator 682 has not yet moved, the negative polarity feedback signal exceeds the positive polarity ratio command signal. Therefore, the inverting amplifier 744 increases the positive polarity voltage on the lead 756 to cause an inverting amplifier 774 to render a transistor 776 conducting and energize the solenoid 780. Energizing solenoid 780 actuates the main control valve to a position porting fluid to the actuator assembly 50 to increase the displacement of the motor unit 28.

If the displacement of the motor unit is to be increased by a relatively large amount, the increasingly negative output of the amplifier 760 overcomes the amplifier 758 to render the transistor 764 conducting. This effects energization of the rate control valve solenoid 768 to port fluid at a relatively high flow rate to the actuator assembly 50 to quickly increase the displacement of the motor unit 28 toward the desired displacement. As this is occurring, the feedback signal from the motor swashplate position signal generator 682, which is of a negative polarity, decreases in value.

When the motor swashplate reaches a position close to the position corresponding to the ratio command signal, the feedback signal from the signal generator 682 causes the transistor 764 to be rendered nonconducting with a resulting deenergization of the rate control valve solenoid 768. The swashplate of the motor unit 28 is then slowly and accurately moved toward a position corresponding to the ratio command signal. When the motor swashplate reaches a position corresponding to the ratio command signal, the transistor 776 is rendered nonconducting to deenergize the solenoid 780 so that the main control valve moves back to its neutral position. When the main control valve is in the neutral position it blocks fluid flow to an from the swashplate motor assembly.

In view of the foregoing it is apparent that the left transmission control circuitry 316 operates in the same manner as does the right transmission control circuitry 312. In addition, it should be noted that the left transmission control circuitry 316 operates in the same manner disclosed in the aforementioned Knapp and Cornell application Ser. No. 446,658, filed Feb. 28, 1974, and entitled "Hydrostatic Transmission Control System." Therefore, the mode of operation of the left transmision control circuitry 316 will not be further described herein to avoid prolixity of description.

STRAIGHT TRACKING CONTROL CIRCUITRY

The straight tracking control circuitry 320 (see FIG. 7) includes a speed sensing unit 790 which provides an output signal which varies in value as a direct function of variations in the output speed of the right motor unit 26. Similarly, a second speed sensing unit 792 provides an output or speed signal which varies in value as a direct function of variations in the output speed of the left motor unit 28. The two speed signals are transmitted to circuitry 794 which compares the two speed signals and is effective to provide a straight tracking control signal which effects a variation in the output speeds of at least one of the hydrostatic transmissions 18 or 20 to equalize the two output speeds of the hydrostatic transmission during forward movement of the vehicle. In the illustrated embodiment of the invention the straight tracking control signal effects an increase in the output speed of the slower hydrostatic transmission and a decrease in the output speed of the faster hydrostatic transmission.

The right speed signal generator 790 includes a digital pulse pickup head 800 which cooperates with a toothed wheel or gear mounted on the output shaft of the right motor unit 26 in the same manner previously explained in connection with the speed signal generator 88 of FIG. 1. As the toothed gear wheel 802 rotates with the output shaft 38 of the motor unit 26, the pickup head provides a series of pulses at a pulse rate which varies as a function of variations in the speed of rotation of the toothed wheel 802. These pulses are conducted over a lead 806 and to an AND gate 808 and over a lead 810 to an AND gate 812. During forward operation of the vehicle the AND gate 808 is enabled to transmit the signals to the comparator circuitry 794 and during reverse operation of the vehicle the AND gate 812 is enabled to transmit the speed signal to the comparator circuitry 794.

Similarly, the left speed control generator 792 includes a digital pulse pickup head 816 which cooperates with a toothed wheel or gear 820 mounted on the output shaft 40 of the left motor unit 28. During either forward or reverse movement of the vehicle 10, the pickup head 816 provides a speed signal which varies in value a a direct function of variations in the output speed of the left motor unit 28. The speed signal from the pickup head 816 is in the form of a series of pulses having a pulse rate which varies as a direct function of variations in the output speed of the motor unit 28. These pulses are conducted over a lead 822 to an AND gate 826 and are conducted over a lead 828 to an AND gate 830. During forward operation of the vehicle the AND gate 826 is enabled to transmit the speed signal from the pickup head 816 to the comparator circuitry 794. During reverse movement of the vehicle the AND gate 830 is enabled to transmit the speed signal from the pickup head 816 to the comparator circuitry 794.

During forward movement of the vehicle, the AND gates 808 and 826 are enabled by a signal from the polarity sensing ampliifer 408 (see FIG. 3). As was previously explained, a ratio command signal is conducted to the polarity sensing amplifier 408. During forward operation of the vehicle, the ratio command signal has a negative polarity and is conducted to ground through a diode 834. During reverse operation of the vehicle the ratio command signal has a positive polarity and is transmitted to a lead 838. Thee lead 838 is connected with the AND gates 812 and 830 (see FIG. 7). Therefore, during forward operation of the vehicle 10 a logic zero signal is transmitted over the lead 838 to the AND gates 812 and 830 so that they are disabled. However, during reverse operation of the vehicle a logic one signal, having a value of a positive five volts, is applied to the AND gates 812 and 830 so that they are effective to transmit pulses from the pickup heads 800 and 816. It should be noted that the AND gate 812 transmits the pulses from the right pickup head 800 while the AND GATE 803 transmits the pulses from the left pickup head 816.

During forward operation of the vehicle when a logic zero signal is being applied to the lead 838, an inverter 842 (FIG. 7) applies a logic one signal to the AND gates 808 and 826 to enable them to transmit pulses from the pickup heads 800 and 816. It should be noted that during forward operation of the vehicle 10, the AND gate 808 transmits the pulses from the pickup head 800 while the AND gate 826 transmits the pulses from the pickup head 816.

During forward operation of the vehicle, the pulses from the right pickup head 800 are transmitted through the AND gate 808 and a NOR gate 846 to an AND gate 848. In the absence of a steering command signal, the AND gate 848 is enabled by a signal over a lead 850 so that the speed signal pulses are transmitted to a monomultivibrator 854. The output of the multivibrator 854 is a series of uniform pulses having a pulse rate corresponding to the pulse rate of the pulses transmitted from the pickup head 800. These pulses are inverted to down going pulses by an amplifier 856 having an inverting terminal connected with the multivibrator 854. The down going pulses from the multivibrator 856 are transmitted to a summing junction 860.

During forward movement of the vehicle 10, the AND gate 826 is enabled by a signal from the inverter 842 so that pulses from the left pickup head 816 are transmitted through a NOR gate 864 to an AND gate 866 which, in the absence of a steering command signal, is enabled to transmit the pulses to a monomultivibrator 868. The output from the multivibrator 868 is a series of up going pulses which are transmitted to the summing junction 860.

Figure 6:
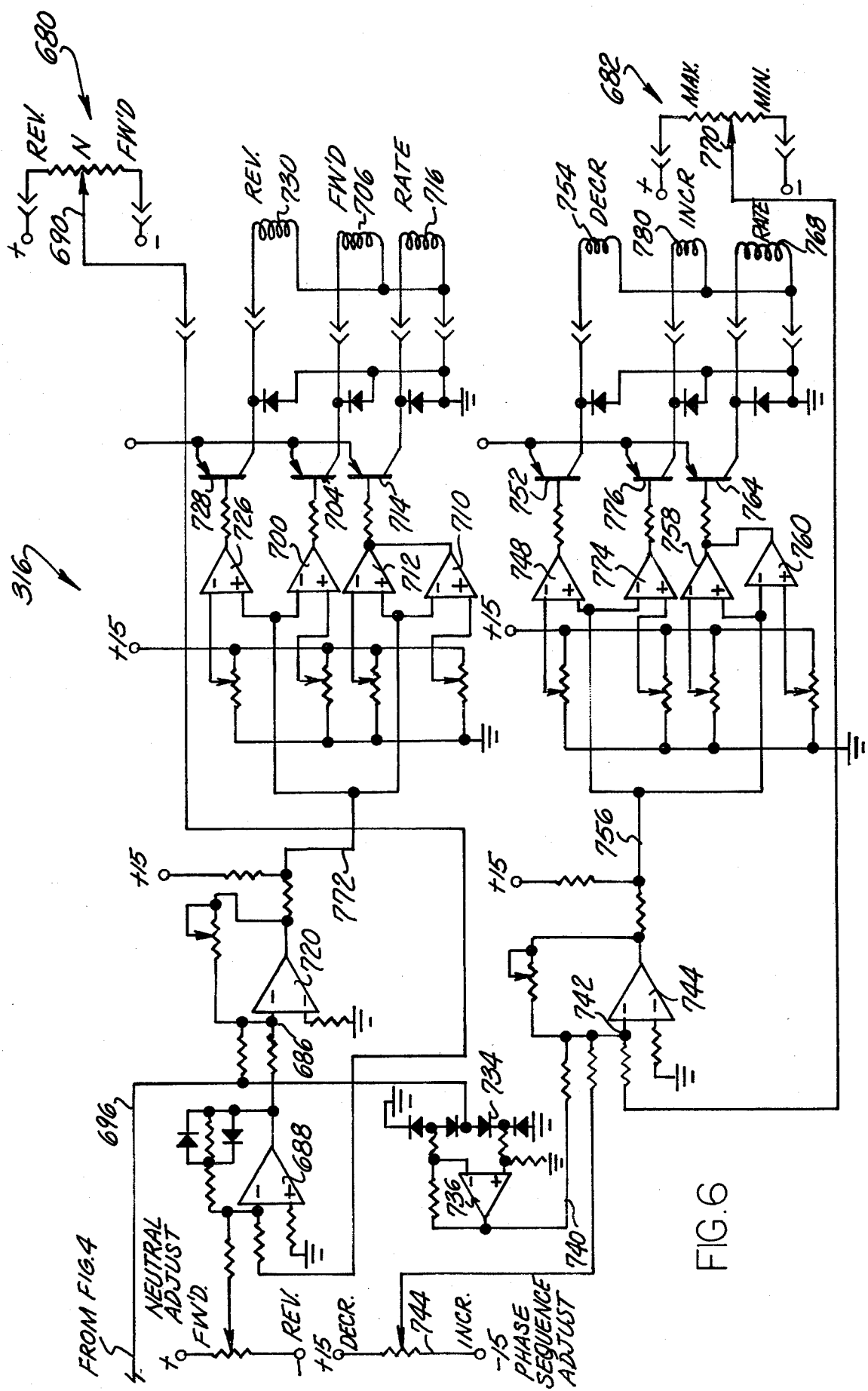

The output from the summing junction 860 is transmitted to the inverting terminal of amplifier 870 and is conducted over a lead 874 to an integrator 876. The straight tracking control signal from the integrator 876 varies in the manner shown by an input-output function transfer graph 880. This straight tracking control signal is transmitted through a switch 884 to an inverting terminal of an amplifier 886 which is connected with a summing junction 890 (FIG. 4) by a lead 892. The summing junction 890 receives the ratio command signal which is conducted over the lead 432. Therefore, a straight tracking control signal is effective to modify the ratio command control signal which is transmitted from the junction 890 to the left transmission control circuitry 316 (FIG. 6).

The straight tracking control signal from the integrator 876 (FIG. 7) is transmitted through a switch 896 to a lead 898 which is connected with a summing junction 900 (see FIG. 4). The summing junction 900 also receives a ratio command signal over a lead 486. Therefore, the straight tracking control signal is effective to modify the ratio command signal transmitted to the right transmission control circuitry 312 (FIG. 5).

Assuming that the output speed of the right hydrostatic transmission 20 during forward movement of the vehicle 10, the speed signal from the right pickup head 800 will have a higher pulse rate than the speed signal from the left pickup head 816. Therefore the pulse rate of the down going pulses transmitted to the summing junction 860 is greater than the pulse rate of the up going pulses transmitted to the summing junction 860. Since the summing junction 860 is connected to the inverting terminal of the amplifier 872, the integrator 876 has a negative-going output signal to the inverting amplifier 886. The resulting positive-going output signal conducted over the lead 892 to the junction 890 (FIG. 4) adds to the positive voltage of the ratio command signal conducted to the summing junction 890 over the lead 432. This results in operation of the left transmission control circuitry 316 (see FIG. 6) to increase the output speed of the relatively slow left hydrostatic transmission 20.

In addition, the negative output signal from the integrator 876 (FIG. 7) is conducted over the lead 898 to the summing junction 900 (FIG. 4). Since the ratio command signal has a positive polarity at the summing junction 900 during forward operation of the vehicle 10, the negative straight tracking control signal subtracts from the value of the ratio command signal. This causes the right transmission control circuitry 312 (FIG. 5) to effect a reduction in the output speed of the relatively fast right hydrostatic transmission 18.

If the output speed of the right hydrostatic transmission 18 should tend to increase during reverse operation of the vehicle 10, the pulses from the right pickup head 800 are conducted over the leads 806 and 810 to the AND gate 812 which is enabled during reverse operation of the vehicle. It should be noted that the AND gate 808 is disabled so that the pulses from the right pickup head 800 cannot be transmitted to the multivibrator 854 but are rather transmitted to the multivibrator 868. Similarly, the speed signal from the left pickup head 816 is transmitted over the leads 822 and 828 to the AND gate 830.

The relatively high pulse rate of the signals from the right pickup head 800 result in the up going pulses from the multivibrator 868 having a higher pulse rate than the down going pulses transmitted from the multivibrator 854 and inverting amplifier 856. Therefore the steering control signal from the integrator 876 has a positive-going output voltage of a magnitude which varies as a direct function of variations in the amount in which the output speed of the left hydrosotatic transmission 18 exceeds the output speed of the left hydrostatic transmission 20. The positive polarity straight tracking command signal is transmitted from the integrator 876 through the inverting amplifier 868 to the lead 892 and summing junction 890 (see FIG. 4). Since the vehicle 10 is being operated in a reverse direction, the ratio command signal transmitted to the summing junction 890 also has a negative polarity. Therefore the negative straight tracking control signal transmitted from the inverting amplifier 886 adds to the ratio command signal to effect activation of the left transmission control circuitry 316 to increaase the reverse speed of the relatively slow left hydrostatic transmission 20.

In addition, the positive straight tracking command signal transmitted from the integrator 876 is conducted over the lead 898 to the summing junction 900 (see FIg. 4). Since the vehicle 10 is moving in a reverse direction, the ratio command signal has a negative polarity. Therefore, the positive straight tracking control signal opposes the negative ratio command signal so that the right transmission control circuitry 312 is activated to reduce the output speed of the relatively fast right hydrostatic transmission 18.

Of course, if the output speed of the left hydrostatic transmission 20 should exceed the output speed of the right hydrostatic transmission, the pulse rate of the speed signal from the left pickup head 816 will be greater than the pulse rate of the speed signal from the right pickup head 800. This results in a reduction in the output speed of the left hydrostatic transmission and an increase in the output speed of the right hydrostatic transmission in the manner previously explained in connection with forward operation of the vehicle 10.

It should be noted that the output speeds of both hydrostatic transmissions do not have to be varied in the manner previously explained to provide for straight tracking control functions. Thus, if the switch 896 (see FIG. 7) is opened and the switch 884 is closed (as shown) only the output speed of the left hydrostatic transmission 20 will be varied in response to a straight tracking control signal. Similarly, if the left switch 884 were opened and the right switch 896 maintained in the closed position of FIG. 7, only the output speed of the right hydrostatic transmission 18 would be varied in response to a straight tracking control signal.

Upon turning of the vehicle it is necessary to disable the straight tracking control circuitry 320. This is accomplished by rendering the AND gates 848 and 866 (FIG. 7) nonconducting. To this end, actuation of either the right steering signal control generator 470 (FIG. 4) or the left steering control signal generator 422 results in the transmission of a zero logic or negative signal over a lead 910 to disable the AND gates 848 and 866. This negative output signal is provided by steering command sensing circuitry 912 (see FIG. 4).

The steering command sensing circuitry 912 is connected with the right steering command signal generator 470 (FIG. 4) by a lead 914. Similarly, the steer command sensing circuitry 912 is connected with the left steering command signal generator 422 by a lead 916. When the steering command signal generators 470 and 422 are in the unactuated condition of FIG. 4, these lines are grounded.

When the steering control signal generators 470 and 422 are in the unactuated condition ground is being transmitted over the leads 914 and 916, the ratio command signal is transmitted to the inverting terminal of an amplifier 918. Assuming that the vehicle 10 is being operated in a forward direction, the ratio command signal transmitted to the inverting terminal of the amplifier 918 has a positive polarity. Therefore, the amplifier 918 will have a negative output signal. During forward operation of the vehicle, a relay solenoid coil 920 (see FIG. 3) is deenergized so that a switch 922 is in the open condition illustrated in FIG. 4. Therefore the noninverting terminal of an amplifier 924 is dominating due to the negative feedback to the inverting terminal. This results in a negative output from the amplifier 924 to the inverting terminal of an amplifier 926. The resulting logic one or positive polarity output signal from the amplifier 926 is transmitted over a lead 910 to the AND gates 848 and 866 (FIG. 7) to enable the AND gates to transmit speed signals from the pickup heads 800 and 816 to the multivibrators 854 and 868.

If during forward operation of the vehicle 10 one of the steering command signal generators 470 or 422 (FIG. 4) is actuated, for example the left steering command signal generator 422, a signal of a polarity opposite from the polarity from the ratio command signal is transmitted to the inverting terminal of the amplifier 918. Resistances 930 and 932 (FIG. 4) through which a signal from one of steering signal generators 422 or 470 must pass have a relatively small value compared to the value of a resistance 934 through which the ratio command signal is conducted to the inverting terminal of the amplifier 918. Therefore, a relatively strong signal of opposite polarity from the polarity of the ratio command signal is transmitted to the inverting terminal of the amplifier 918.

Assuming that the vehicle is moving straight forward and is to be turned toward the left, the left steering signal generator 422 (FIG. 4) is actuated. This results in a transmission of a negative polarity signal through the relatively small resistance 932 to the inverting input terminal of the amplifier 918. This negative polarity steering signal opposes and, due to the relatively large size of the resistance 934, overcomes the positive polarity ratio command signal. Therefore, the output of the amplifier 918 shifts from a negative polarity to a positive polarity. Since the vehicle is moving forward and the switch 922 is open, the noninverting terminal of the amplifier 924 is dominant and the positive polarity signal is transmitted to the inverting terminal of the amplifieir 926. This results in a negative or logic zero output from the amplifier 926. The output from the amplifier 926 is conducted over the lead 910 to the AND gates 848 and 866 (see FIG. 7) to block the transmission of speed signals from the pickup heads 800 and 816. Of course, this renders the straight tracking control circuitry 320 ineffective.

During reverse movement of the vehicle on a straight path, a ratio command signal of a negative polarity is transmitted to the inverting terminal of the amplifier 918. During reverse movement of the vehicle the relay coil 920 (FIG. 3) is energized to close the switch 922 (FIG. 4). This shorts the noninverting terminal of the amplifier 924 (FIG. 4) out to ground so that the inverting terminal dominates. Therefore, the positive output signal from the amplifier 918 is inverted by the amplifier 924 to a negative output signal which is in turn inverted to a positive output signal by the amplifier 926. This positive or logic one output signal enables the AND gates 848 and 866 (FIG. 7) during reverse movement of the vehicle along a straight path.

Upon actuation of one of the steering signal generators 722 or 470 (FIG. 4) during reverse movement of the vehicle 10, a steering signal of positive polarity is transmitted to the inverting terminal of the amplifier 918. The relatively strong steering signal dominates the relatively weak ratio command signal so that the amplifier 918 has a negative output. Since the noninverting terminal of the amplifier 924 has been connected to ground through closed switch 922, the inverting terminal of the amplifier 924 dominates and the amplifier 924 has a positive output signal. This output signal is inverted by the amplifier 926 to provide a logic zero signal on the lead 910. Of course, this renders the AND gates 948 and 966 (FIG. 7) nonconducting to disable the straight tracking control circuitry 320 during turning of the vehicle in the reverse direction.

ANTI-STALL SYSTEM

The anti-stall control circuitry 324 (FIG. 8) includes an engine speed signal generator 940 whic provides a speed signal which varies in value as a function of variations in the output speed of the engine 16. A throttle reference signal generator 942 provides an output signal which varies in value as a function of variations in the setting of the throttle 118. If an impending stall condition is present, the engine speed signal will fall below a value correponding to the value of the throttle setting signal. When this occurs, the ratio command signal is modified by an anti-stall signal to effect a reduction in the output speeds of the hydrostatic transmission 18 and 20.

Figure 7:
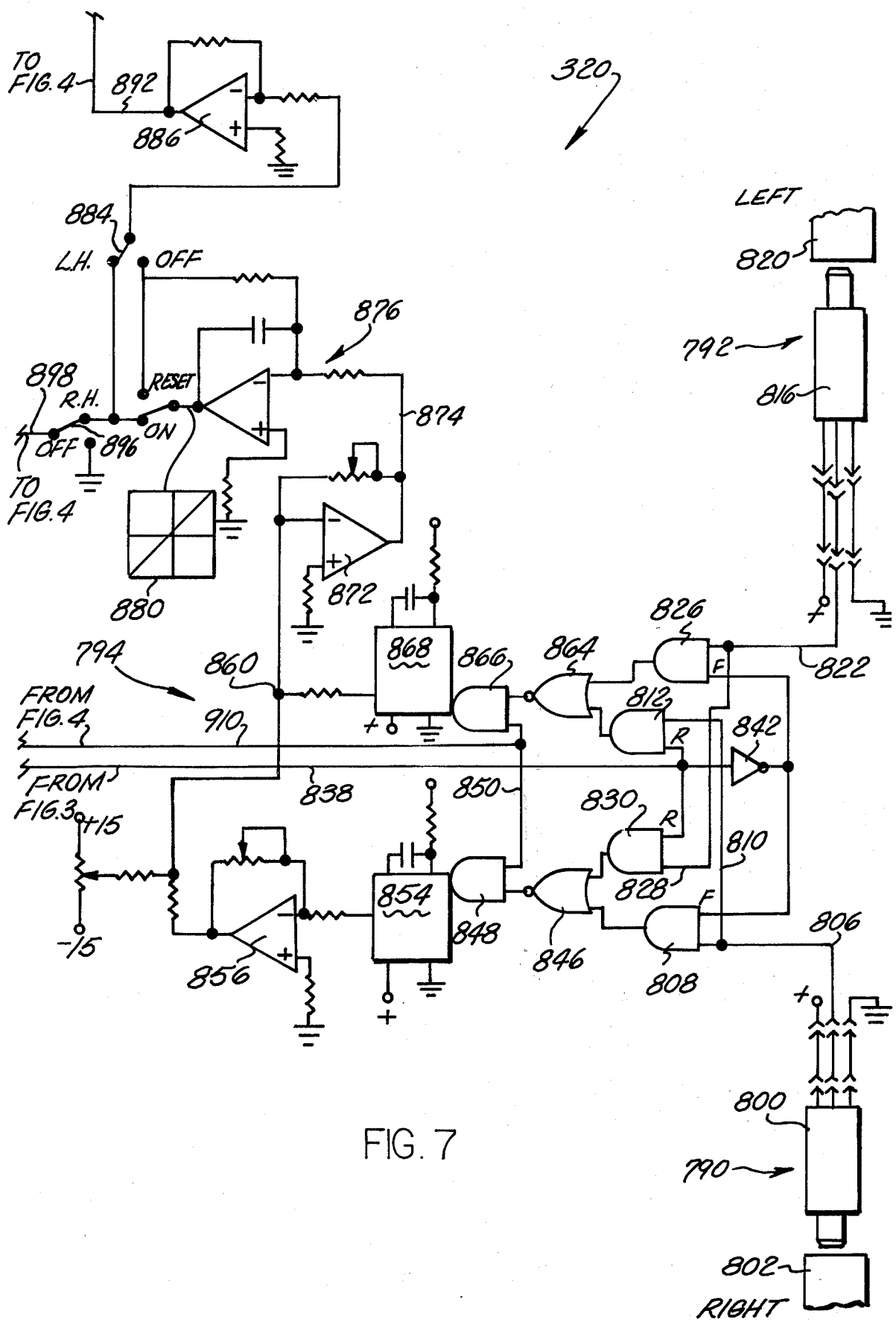

The engine speed signal generator 940 includes a digital voltage pickup head 944 of the same construction as the pickup heads 800 and 816 of FIG. 7, which cooperates with a toothed wheel 945 driven by the engine output shaft. Therefore, the rate at which the teeth on the pickup wheel 945 are rotated relative to the pickup head 944 varies as a direct function of variations in the output speed of the engine 16. The pickup head 944 provides a series of output pulses having a frequency rate which varies as a function of variations in the output speed of the engine 16. These output pulses are transmitted through an AND gate 946 to monostable-multivibrator 948. The series of uniform pulses from the multivibrator 948 are transmitted through an amplitude adjusting potentiometere 950 to a low pass filter 952 having an output signal of a negative voltage which varies in absolute value as a direct function in variations in the output speed of the engine 16. The output signal from the low pass filter 952 has a configuration in accordance with the input-output function transfer graph 954 of FIG. 8.

The throttle setting signal generator 942 is a potentiometer having a wiper 958 which is connected with the throttle lever. Upon adjustment of the position of the throttle lever to vary the engine speed, the wiper 958 is moved by a proportional distance relative to a fixed resistance 960 so that a positive polarity output signal on a lead 962 varies in value as a direct function of variations in throttle setting. The throttle setting signal is transmitted by the lead 962 to a summing junction 964 to which the engine speed signal is also transmitted. If the engine speed signal is at least as great as the throttle setting signal, a negative signal will be provided to an inverting terminal of amplifier 966. However, if the engine speed signal is less than the throttle setting signal a positive signal will be provided to the inverting terminal of the amplifier 966.

When the engine speed falls below a speed corresponding to the throttle setting, an anti-stall signal of a negative polarity is transmitted over a lead 968. However, if the engine speed is somewhat greater than the speed corresponding to the throttle setting a positive signal is provided on the lead 968. In order to dampen variations in the anti-stall signal, it is transmitted through a power compensator circuit 970 which integrates the anti-stall signal. In addition, a proportional circuit 972 transmits the anti-stall signal to a lead 974. It should be noted that the anti-stall signal passes through an inverting amplifier 976 in the power compensator circuit 970 and through an inverting amplifier 978 in the proportional circuit 972. Therefore, the anti-stall signal transmitted to the lead 974 has a negative polarity when the engine speed is somewhat greater than the speed corresponding to the throttle setting and has a positive polarity when the engine speed is less than the throttle setting.

This anti-stall signal is transmitted to the inverting terminal of an amplifier 982. Assuming that the engine is operating at a speed which is somewhat greater than the speed corresponding to the throttle setting signal, the positive output from the amplifier 982 is conducted to ground through a diode 984. Therefore whenever the engine is operating at a speed which is greater than a speed corresponding to the throttle setting the anti-stall signal is shorted to ground. This is because when the engine speed is greater than the speed corresponding to the throttle setting, there is no danger of the engine stalling. When the engine is operating at a speed which is somewhat less than the speed corresponding to the throttle setting, there is a danger of the engine stalling and the negative output signal from the amplifier 984 cannot pass through the diode to ground.

If the vehicle 10 is driven in a forward direction, a relay coil 986 (FIG. 3) is deenergized to close a switch 988 (FIG. 8). Closing the switch 988 connects the noninverting terminal of an amplifier 990 with ground so that a negative anti-stall signal is transmitted to the dominating inverting terminal of the amplifier 990. The positive output from the amplifier 990 is utilized to modify the ratio command signal and to effect a reduction in the output speeds of the hydrostatic transmissions 18 and 20.

During forward operation of the vehicle 10, the positive polarity anti-stall signal which has a value which varies as a function of variations in the difference between the speed corresponding to the throttle setting and the actual engine speed, is transmitted to a summing junction 384 (see FIG. 3). As previously discussed, the ratio command signal is also transmitted to the summing junction 384. During forward operation of the vehicle 10, the ratio command signal transmitted to the summing junction 384 has a negative polarity. Therefore, the positive polarity of the anti-stall signal opposes the negative ratio command signal to effect a reduction in the output speed of the hydrostatic transmissions.

If the vehicle 10 is traveling in a reverse direction and an impending stall condition is present, the positive under speed signal transmitted to the inverting terminal of the amplifier 982 results in the amplifier having a negative output. During reverse operation of the vehicle 10, the coil 986 (FIG. 3) is energized and effects movement of the formerly closed switch 988 to an opening condition. Due to the negative feedback applied to the inverting terminal of the amplifier 990, the noninverting terminal dominates during reverse movement of the vehicle 10. Therefore, the amplifier 990 has a negative output signal which is transmitted over the lead 994 to the summing junction 384 (see FIG. 3). Since the ratio command signal has a positive polarity at the summing junction 384 during reverse movement of the vehicle 10, the anti-stall signal opposes the ratio command signal to effect reduction in the output speeds of the hydrostatic transmission 18 and 20.

Having described specific preferred embodiments of the invention, the following is claimed:

1. An apparatus comprising a plurality of hydrostatic transmissions having pump and motor units, first actuator means for varying the displacement of at least one unit of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main command signal generator means for providing a main electrical command signal which is variable to correspond to any one of a plurality of output speeds and displacements of said first and second hydrostatic transmissions, first electrical control means for effecting operation of said first actuator means to vary the displacement of at least one of said units of said first hydrostatic transmission in response to variations in said main electrical command signal, second electrical control means for effecting operation of said second actuator means to vary the displacement of at least one of said units of said second hydrostatic transmission in response to variations in said main electrical command signal, and first secondary command signal generator means for providing a first secondary electrical command signal, said first electrical control means including means for effecting operation of said first actuator means to vary the displacement of at least said one unit of said first hydrostatic transmission to a displacement other than the displacement indicated by said main electrical command signal in response to said first secondary electrical command signal to vary the output speed of said first hydrostatic transmission relative to the output speed of said second hydrostatic transmission.

2. An apparatus as set forth in claim 1 further including second secondary command signal generator means for providing a second secondary electrical command signal, said second electrical control means including means for effecting operation of said second actuator means to vary the displacement of at least said one unit of said second hydrostatic transmission to a displacement other than the displacement indicated by said main electrical command signal in response to said secondary electrical command signal to vary the output speed of said second hydrostatic transmission relative to the output speed of said first hydrostatic transmission.

3. An apparatus as set forth in claim 2 wherein said first actuator means is operable to vary the displacement of said one unit of said first hydrostatic transmission between a forward operating condition in which said first hydrostatic transmission has an output speed in a forward direction and a reverse operating condition in which said first hydrostatic transmission has an output speed in a reverse direction, said second actuator means being operable to vary the displacement of said one unit of said second hydrostatic transmission between a forward operating condition in which said second hydrostatic transmission has an output speed in the forward direction and a reverse operating condition in which said second hydrostatic transmission has an output speed in a reverse direction, said main electrical command signal generator means including means for providing a main command signal having a first characteristic and value to effect operation of said first and second hydrostatic transmissions in the forward direction at a first speed and a second characteristic and value to effect operation of said first and second hydrostatic transmissions in the reverse direction at said first speed, said first secondary command signal generator means including means for providing a secondary electrical command signal of said second characteristic and at least said second value when said main electrical command signal has said first characteristic and value to effect operation of said first hydrostatic transmission in the reverse direction at said first speed during operation of said second hydrostatic transmission in the forward direction at said first speed, said second secondary command signal generator means including means for providing a secondary electrical command signal of said second characteristic and at least said second value when said main electrical command signal has said first characteristic and value to effect operation of said second hydrostatic transmission in the reverse direction at said first speed during operation of said first hydrostatic transmission in the forward direction at said first speed.

4. An apparatus comprising a plurality of hydrostatic transmissions having pump and motor units, first actuator means for varying the displacement of at least one unit of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main command signal generator means for providing a main electrical command signal which is variable to correspond to any one of a plurality of output speeds and displacements of said first and second hydrostatic transmissions, first electrical control means for effecting operation of said first actuator means to vary the displacement of at least one of said units of said first hydrostatic transmission in response to variations in said main electrical command signal, second electrical control means for effecting operation of said second actuator means to vary the displacement of at least one of said units of said second hydrostatic transmission in response to variations in said main electrical command signal, and first feedback signal generator means for providing a first electrical feedback signal which is indicative of the displacement of said one unit of said first hydrostatic transmission, said first control means including means for comparing said main electrical command signal and said first electrical feedback signal and for effecting operation of said first actuator means to vary the displacement of said one unit of said first hydrostatic transmission when said main electrical command signal and said first electrical feedback signal are indicative of different displacements.

5. An apparatus as set forth in claim 4 further including second feedback signal generator means for providing a second electrical feedback signal which is indicative of the displacement of said one unit of said second hydrostatic transmission, said second control means including means for comparing said main electrical command signal and said second electrical feedback signal and for effecting operation of said second actuator means to vary the displacement of said one unit of said second hydrostatic transmission when said main electrical command signal and said second electrical feedback signals are indicative of different displacements.

6. An apparatus as set forth in claim 5 further including first speed sensing means for providing a third electrical feedback signal which is indicative of the output speed of said first hydrostatic transmission, second speed sensing means for providing a fourth electrical feedback signal which is indicative of the output speed of said second hydrostatic transmission, and means for comparing said third and fourth electrical feedback signals and effecting operation of at least one of said actuator means to vary the displacement of at least said one of the unit of said first hydrostatic transmission when the output speed of one of said hydrostatic transmissions is greater than the output speed of the other of said hydrostatic transmissions.

7. An apparatus comprising a plurality of hydrostatic transmissions having pump and motor units, first actuator means for varying the displacement of at least one unit of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main command signal generator means for providing a main ellectrical command signal which is variable to correspond to any one of a plurality of output speeds and displacements of said first and second hydrostatic transmissions, first electrical control means for effecting operation of said first actuator means to vary the displacement of at least one of said units of said first hydrostatic transmission in response to variations in said main electrical command signal, second electrical control means for effecting operation of said second actuator means to vary the displacement of at least one of said units of said second hydrostatic transmission in response to variations in said main electrical command signal, and first speed sensing means for providing a first electrical feedback signal which is indicative of the output speed of said first hydrostatic transmission, said first control means including means for comparing said main electrical command signal and said first electrical feedback signal and for effecting operation of said first actuator means to vary the displacement of said one unit of said first hydrostatic transmission when said main electrical command signal and said first electrical feedback signal are indicative of different output speeds.

8. An apparatus as set forth in claim 7 further including second speed sensing means for providing a second electrical feedback signal which is indicative of the output speed of said second hydrostatic transmission, said second control means including means for comparing said main electrical command signal and said second electrical feedback signal and for effecting operation of said second actuator means to vary the displacement of said one unit of said second hydrostatic transmission when said main electrical command signal and said second electrical feedback signal are indicative of different output speeds.

9. An apparatus as set forth in claim 8 further including means for comparing said first and second electrical feedback signals and effecting operation of at least one of said actuator means to vary the displacement of at least said one of the units of said first hydrostatic transmission when the output speed of one of said hydrostatic transmissions is greater than the output speed of the other of said hydrostatic transmissions.

10. An apparatus comprising a plurality of hydrostatic transmissions having pump and motor units, first actuator means for varying the displacement of at least one unit of a first one of said hydrostatic transmissions to vary the output speed of said first hydrostatic transmission, said actuator means for varying the displacement of at least one unit of a second one of said hydrostatic transmissions to vary the output speed of said second hydrostatic transmission, main command signal generator means for providing a main electrical command signal which is variable to correspond to any one of a plurality of output speeds and displacements of said first and second hydrostatic transmissions, first electrical control means for effecting operation of said first actuator means to vary the displacement of at least one of said units of said first hydrostatic transmission in response to variations in said main electrical command signal, second electrical control means for effecting operation of said second actuator means to vary the displacement of at least one of said units of said second hydrostatic transmission in response to variations in said main electrical command signal, and acceleration limiter means for limiting the rate of change of said main electrical command signal upon operation of said main command signal generator means.

11. An apparatus as set forth in claim 10 wherein said acceleration limiter means includes filter means for attenuating high frequency components of said main electrical command signal.

12. An apparatus comprising a plurality of hydrostatic transmissions having pump and motor units, first actuator means for varying the displacement of at least one unit of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main command signal generator means for providing a main electrical command signal which is variable to correspond to any one of a plurality of output speeds and displacements of said first and second hydrostatic transmissions, first electrical control means for effecting operation of said first actuator means to vary the displacement of at least one of said units of said first hydrostatic transmission in response to variations in said main electrical command signal, second electrical control means for effecting operation of said second actuator means to vary the displacement of at least one of said units of said second hydrostatic transmission in response to variations in said main electrical command signal, prime mover means for driving said pump units of said first and second hydrostatic transmissions, and anti-stall means for detecting when the output speed of said prime mover means decreases to a speed which is less than a predetermined reference speed to modify said main electrical command signal to reduce the output speed to which said main electrical command signal corresponds.

13. An apparatus as set forth in claim 12 wherein said prime mover means includes selectively settable throttle means for effecting variations in the output speed of said prime mover means as a function of variations in the setting of said throttle means, and said anti-stall means includes speed sensing means for providing an electrical speed signal which is indicative of the output speed of said prime mover means, throttle setting signal generator means for providing an electrical throttle setting signal which varies as a function of the setting of said throttle means, and means for comparing said electrical speed and throttle setting signals and for operating on said main electrical command signal to reduce the hydrostatic transmission output speed indicated by said main electrical command signal when said electrical speed signal indicates that the output speed of said prime mover is less than a predetermined function of the setting of said throttle means.

14. An apparatus comprising a plurality of hydrostatic transmissions having pump and motor units, first actuator means for varying the displacement of at least one unit of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main command signal generator means for providing a main electrical command signal which is variable to correspond to any one of a plurality of output speeds and displacements of said first and second hydrostatic transmissions, first electrical control means for effecting operation of said first actuator means to vary the displacement of at least one of said units of said first hydrostatic transmission in response to variations in said main electrical command signal, second electrical control means for effecting operation of said second actuator means to vary the displacement of at least one of said units of said second hydrostatic transmission in response to variations in said main electrical command signal, and means for detecting when the output speed of one of said hydrostatic transmissions is different than the output speed of the other hydrostatic transmission for effecting operation of one of said actuator means to reduce the faster output speed and for effecting operation of the other said actuator means to increase the slower output speed.

15. An apparatus comprising a plurality of hydrostatic transmissions having pump and motor units, first actuator means for varying the displacement of said pump and motor units of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main command signal generator means for providing a main electrical command signal which is variable to correspond to any one of a plurality of output speeds and displacements of said first and second hydrostatic transmissions, said main command signal generator means including means for varying the value of said main electrical command signal between a first range of values corresponding to a relatively small displacement of said pump unit of said first hydrostatic transmission and relatively large displacement of said motor unit of said first hydrostatic transmission and a second range of values corresponding to relatively large displacement of said pump unit of said first hydrostatic transmission and relatively small displacement of said motor unit of said first hydrostatic transmission, first electrical control means for effecting operation of said first actuator means to vary the displacement of said units of said first hydrostatic transmission in response to variations in said main electrical command signal, said first electrical control means including means for effecting operation of said first actuator means to vary only the displacement of said pump unit of said first hydrostatic transmission during variations in the value of said main electrical command signal in said first range of values, for effecting operation of said first actuator means to vary only the displacement of said motor unit of said first hydrostatic transmission during variations in the value of said main electrical command signal in said second range of values, and for effecting operation of said first actuator means to vary the displacements of both the pump and motor units of said first hydrostatic transmission during variations in the value of said main electrical command signal between said first and second ranges of value, and second electrical control means for effecting operation of said second actuator means to vary the displacement of at least one of said units of said second hydrostatic transmission in response to variations in said main electrical command signal.

16. An apparatus as set forth in claim 15 wherein said second actuator means for varying the displacement of said pump and motor units of said second hydrostatic transmission, said main command signal generator means includes means for varying the value of said main electrical command signal between a first range of values corresponding to a relatively small displacement of said pump units and relatively large displacements of said motor units in a second range of values corresponding to relatively large displacements of said pump units and relatively small displacement of said motor units, and said electrical control means includes means for effecting operation of said second actuator means to vary only the displacement of said pump unit of said second hydrostatic transmission during variations in the value of said main electrical command signal in said first range of values, for effecting operation of said second actuator means to vary only the displacement of said motor unit of said second hydrostatic transmission during variations in the value of said main electrical command signal in said second range of values, and for effecting operation of said second actuator means to vary the displacement of both the pump and motor units of said second hydrostatic transmission during variations in the value of said main electrical command signal between said first and second ranges of values.

17. An apparatus comprising a plurality of transmissions having pump and motor units, first actuator means for varying the displacement of at least one of said units of said first hydrostatic transmission to vary the output speed of said first hydrostatic transmission, second actuator means for varying the displacement of at least one of said units of said second hydrostatic transmission to vary the output speed of said second hydrostatic transmission, first speed sensing means for providing a first electrical speed signal indicative of the output speed of said first hydrostatic transmission, second speed sensing means for providing a second electrical speed signal indicative of the output speed of said second hydrostatic transmission, means for comparing said first and second electrical speed signals to detect when one of said hydrostatic transmissions has a different output speed than the other hydrostatic transmission, and electrical control means for effecting operation of at least one of said actuator means to vary the displacement and output speed of at least one of said hydrostatic transmissions upon detection that said first and second hydrostatic transmissions have different output speeds.

18. An apparatus as set forth in claim 17 wherein said means for comparing said first and second electrical speed signals includes first and second channel means for receiving said first and second electrical speed signals, and switching means for transmitting electrical speed signals from said first speed sensing means to said first channel means and for transmitting electrical speed sensing signals from said second speed sensing means to said second channel means during forward operation of said first and second hydrostatic transmission, said switching means being operable to transmit electrical speed signals from said first speed sensing means to said second channel means and to transmit electrical speed signals from said second speed sensing means to said first channel means during reverse operation of said first and second hydrostatic transmissions.

19. An apparatus as set forth in claim 17 wherein said electrical control means includes means for effecting operation of one of said actuator means to increase the output speed of the slower one of said first and second hydrostatic transmissions upon detection of a difference in their output speeds and means for effecting operation of the other of said actuator means to decrease the output speed of the faster one of said first and second hydrostatic transmissions upon detection of a difference in their output speeds.

20. An apparatus as set forth in claim 17 wherein said first speed sensing means includes means for providing a first series of electrical pulses having a first pulse rate which varies as a function of the output speed of said first hydrostatic transmission, said second speed sensing means including means for providing a second series of electrical pulses having a second pulse rate which varies as a function of the output speed of said second hydrostatic transmission, said means for comparing said first and second electrical speed signals including means for providing an output signal which varies as a function of the difference between said first and second pulse rates.

21. An apparatus comprising a plurality of hydrostatic transmissions having pump and motor units, first actuator means for varying the displacement of at least one unit of a first one of said hydrostatic transmissions to vary the output speed of said first hydrostatic transmission, second actuator means for varying the displacement of at least one unit of a second one of said hydrostatic transmissions to vary the output speed of said second hydrostatic transmission, main control means for effecting operation of said first and second actuator means to contemporaneously vary the displacement of at least one unit of each of said first and second hydrostatic transmissions by substantially equal amounts, speed equalizer means for detecting when the output speed of one of said hydrostatic transmissions is different than the output speed of the other hydrostatic transmission and for providing a control signal to effect operation of at least one of said actuator means to equalize the output speeds of said first and second hydrostatic transmissions in response to detection of a difference in their output speeds, secondary control means for effecting operation of at least one of said actuator means to vary the output speed of one of said hydrostatic transmissions relative to the output speed of the other hydrostatic transmission, and disabling means for rendering said speed equalizer means ineffective to provide a control signal upon operation of said secondary control means.

22. An apparatus as set forth in claim 21 wherein said speed equalizer means includes first speed sensing means for providing a first speed signal which varies as a function of the output speed of said first hydrostatic transmission, second speed sensing means for providing a second speed signal which varies as a function of the output speed of said second hydrostatic transmission, and comparator means for comparing said first and second speed signals and providing said control signal when said first and second speed signals correspond to different speeds, said disabling means including means for preventing the transmission of speed signals to said comparator means upon operation of said secondary control means.

23. An apparatus comprising a hydrostatic transmission having pump and motor units and adapted to be driven by an engine, actuator means for varying the displacement of at least one unit of said hydrostatic transmission to vary the output speed of said hydrostatic transmission, main command signal generator means for providing a main electrical command signal which is variable to correspond to any one of a plurality of output speeds and displacements of said hydrostatic transmission, electrical circuit means for effecting operation of said first actuator means to vary the displacement of at least one of said units of said first hydrostatic transmission in response to variations in said main electrical command signal, and anti-stall means for detecting the occurrence of an impending overloading the engine and for effecting a modification of the main electrical command signal to reduce the output speed of said hydrostatic transmission in response to detection of an impending overloading of the engine, said anti-stall means including throttle position signal generator means for providing a first electrical signal which is indicative of engine throttle position, speed signal generator means for providing a second electrical signal which is indicative of engine speed, and means for comparing said first and second electrical signals.

24. An apparatus as set forth in claim 23 wherein said speed signal generator means includes means for providing a series of pulses having a pulse rate which varies as a function of engine speed.

* * * * *

UNITED STATES PATENT AND TRADEMARK OFFICE
CERTIFICATE OF CORRECTION

PATENT NO. : 3,914,938
DATED : 10/28/75
INVENTOR(S) : Charles R. Cornell, Gerald F. O'Callaghan It is certified that error appears in the above-identified patent and that said Letters Patent are hereby corrected as shown below:

| | |
|---|---|
| Col. 1, line 14: | "actuable" should read "actuatable". |
| Col. 5, line 10: | "provids" should read "provides". |
| Col. 6, line 30: | "68" should read "168". |
| line 41: | "143" should read "134". |
| Col. 12, line 30: | "tramsfer" should read "transfer". |
| line 65: | "desner" should be condenser. |
| Col. 14, line 27: | "Therfore" should read "Therefore". |
| Col. 16, line 37: | "330" should read "300". |
| Col. 33, line 8: | "said" should read "second". |

Signed and Sealed this tenth Day of February 1976

[SEAL]

Attest:

RUTH C. MASON
Attesting Officer

C. MARSHALL DANN
Commissioner of Patents and Trademarks